(12) United States Patent
Arita et al.

(10) Patent No.: US 7,970,366 B2
(45) Date of Patent: Jun. 28, 2011

(54) DIVERSITY RECEIVER

(75) Inventors: Eiji Arita, Tokyo (JP); Jun Ido, Tokyo (JP); Akiko Maeno, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 630 days.

(21) Appl. No.: 12/068,962

(22) Filed: Feb. 13, 2008

(65) Prior Publication Data

US 2008/0238808 A1 Oct. 2, 2008

(30) Foreign Application Priority Data

Feb. 15, 2007 (JP) ................ 2007-034660

(51) Int. Cl.
*G06F 3/033* (2006.01)
(52) U.S. Cl. ........ 455/130; 455/132; 455/134; 455/272; 455/273; 343/713
(58) Field of Classification Search .......... 455/130, 455/132, 134, 272, 273; 343/713
See application file for complete search history.

(56) References Cited

U.S. PATENT DOCUMENTS

| | | | |
|---|---|---|---|
| 2004/0196202 A1 | 10/2004 | Shirosaka et al. | |
| 2004/0196204 A1 | 10/2004 | Shirosaka et al. | |
| 2005/0001765 A1* | 1/2005 | Ryu et al. | 342/377 |
| 2005/0032497 A1* | 2/2005 | Girardeau et al. | 455/272 |
| 2005/0152264 A1* | 7/2005 | Siwiak | 370/206 |
| 2005/0245224 A1 | 11/2005 | Kurioka | |
| 2006/0050005 A1 | 3/2006 | Shirosaka et al. | |

FOREIGN PATENT DOCUMENTS

| | | |
|---|---|---|
| JP | 5-91003 A | 4/1993 |
| JP | 09-307492 A | 11/1997 |
| JP | 2004-260398 A | 9/2004 |
| JP | 2005-223510 A | 8/2005 |
| JP | 2005-318407 A | 11/2005 |
| JP | 2006-60558 A | 3/2006 |
| JP | 2006-148410 A | 6/2006 |
| JP | 2006-229294 A | 8/2006 |
| WO | WO-2004/091043 A1 | 10/2004 |

* cited by examiner

*Primary Examiner* — Sanh D Phu
(74) *Attorney, Agent, or Firm* — Birch, Stewart, Kolasch & Birch, LLP.

(57) ABSTRACT

A diversity receiver is provided with antennas (1a) and (1b) in a first branch and antennas (1c) and (1d) in a second branch each of which antenna gains is controlled so that the offset between the directions of directional radiation patterns for the first and second branches becomes approximately π/2. Thereby, the diversity receiver can obtain a sufficient diversity gain even when it is incorporated into an indoor television with the antennas being built thereinto in close vicinity to one another.

22 Claims, 19 Drawing Sheets

US 7,970,366 B2

DIVERSITY RECEIVER

TECHNICAL FIELD

The present invention relates to diversity reception for a digital-communication receiver or a digital-broadcast receiver, more particularly to a diversity receiver that receives terrestrial digital-broadcasts through antennas built into a television or the like.

BACKGROUND OF THE INVENTION

When receiving digital broadcasts on a television located in a room using an antenna mounted outdoors, a feeder cable is necessarily routed from the antenna to the television. For that reason, when moving a television to be located to another room, a problem arises in that it takes an effort to re-route the feeder cable having been routed.

Hence, instead of using an antenna mounted outdoors, an indoor antenna has been used or a rod antenna has been built into a television itself.

To watch digital broadcasts, however, a reception signal received by an antenna is needed to exceed a certain level of strength. A problem arises in that, if such a strength level cannot be ensured, no pictures and no sounds are reproduced at all. Moreover, in a terrestrial digital broadcasting system, all the carriers within the bandwidth (5.6 MHz) must be received and a transmitter station is restricted in its output power. Accordingly, in a case of an antenna being mounted in a bad condition, there has been a problem in that it is not easy to ensure a reception signal more than a certain level of strength by the antenna.

As a measure for the above problems, it is considered that a diversity scheme, which enhances a receiver gain by diversity-combining reception signals obtained by using a plurality of antennas, is applied to a television. In diversity reception, it has been proposed that a scheme is applied to a vehicle-mounted television, in which a larger level signal is selected from those received by a plurality of antennas or a plurality of reception signals are combined (for example, refer to Japanese Patent application Publication No. 2005-223510, pp. 7-10 and FIG. 3).

Moreover, when an indoor antenna is mounted in a room or a television with a rod antenna built thereinto itself is located in a room, they must be mounted or located to be adjusted in the direction of the antenna or the television. Receiving condition for digital broadcast radio waves always varies according to weather, temperature, and position of persons in a room. For that reason, in order to keep a good receiving condition, a viewer bothers to adjust the direction of the antenna or the television itself every time the viewer recognizes degradation of the receiving condition.

As a measure for eliminating the adjustment, a scheme is applied to a television, in which antennas each are arranged on mutually orthogonal surfaces out of a plurality of television cabinet surfaces to select a larger level signal from those received by the antennas (for example, refer to Japanese Patent Application Publication No. 2006-60558, pp. 5-7 and FIG. 5).

Whereas a terrestrial digital broadcasting system uses horizontally polarized radio waves, a mobile phone system uses vertically polarized radio waves. Hence, in a mobile phone that is not a television but is capable of receiving terrestrial digital broadcasts, in order to obtain a good receiving condition for both radio waves having different polarization planes, a method is applied to a mobile phone, in which the mobile phone is provided with two antennas fixed to the casing thereof to be arranged orthogonally to each other and with an angle sensor capable of measuring the inclination of the mobile phone casing with respect to the horizontal plane (the ground), whereby the phase of a signal received by either one of the two antennas is controlled for a diversity combining (for example, refer to Japanese Patent Application Publication No. 2005-318407, pp. 4-6 and FIG. 1).

In a diversity receiver employing such conventional diversity schemes that are applied to televisions described above, for example, when a plurality of antennas are mounted on a vehicle for an on-board television, a sufficient distance between the antennas is easily ensured for suppressing a fading correlation between the antennas, so that a high diversity gain can be obtained. On the other hand, when antennas are built into a television, it is hard to ensure a sufficient distance between the antennas. Accordingly, there has been a problem in obtaining a high diversity gain.

Moreover, when antennas are built into a television, even though the antennas each are arranged on television cabinet surfaces orthogonal to each other to apply a scheme that selects a larger level signal from those received by the antennas, only a contribution from either one of the antennas is obtained, which has caused a problem that only a low diversity gain is expected.

The above described method applied to a mobile phone that is capable of receiving terrestrial digital broadcasts can be expected to obtain a good receiving condition for radio waves having polarization planes different from each other. To this end, however, antennas must be adjusted in their directions of radiation pattern to be set in the direction of an incoming terrestrial digital broadcast radio wave.

For that reason, there has been a problem in applying the method to a stationary television whose direction is not easily adjusted due to it being located in a room, whereas there arises no problem for the case with the mobile phone because a viewer can readily vary the direction of its antennas with the phone held by hand.

SUMMARY OF THE INVENTION

The present invention is made to solve such problems as described above, and an object of the invention is to provide a diversity receiver that is incorporated in a television with a plurality of built-in antennas for easy installation in a room and is capable of enhancing its diversity gain.

A diversity receiver according to the present invention includes a plurality of first antennas having directional radiation patterns different from each other, for receiving a horizontally polarized broadcast radio signal; a plurality of first variable gain amplifiers provided for the respective first antennas, for adjusting respective gains thereof; a first adder for adding first reception signals having been received by the first antennas and gain-adjusted by the first variable gain amplifiers, to output the first added reception signal; a plurality of second antennas having directional radiation patterns different from each other, arranged in positions different from those of the first antennas, for receiving the horizontally polarized broadcast radio signal; a plurality of second variable gain amplifiers provided for the respective second antennas, for adjusting respective gains thereof; a second adder for adding second reception signals having been received by the second antennas and gain-adjusted by the second variable gain amplifiers, to output the second added reception signal; a diversity-combining circuit for diversity-combining signals based on the first and second added reception signals, to output the diversity-combined signal; and an antenna control unit for controlling the pluralities of first and second variable gain amplifiers.

According to the present invention, a diversity receiver is provided with a plurality of first variable gain amplifiers corresponding to a plurality of first antennas as well as with a plurality of second variable gain amplifiers corresponding to a plurality of second antennas, and is configured to control directions of directional radiation patterns each formed by the first antennas and the second antennas. Therefore, a high diversity gain can be obtained even when these antennas built into a television are arranged in close vicinity to each other.

BEST MODE FOR CARRYING OUT THE INVENTION

Hereinafter, diversity receivers according to embodiments of the present invention will be explained by way of example for a case in which a plurality of antennas is built into a television that receives terrestrial digital broadcasts.

Embodiment 1

Figure 1:
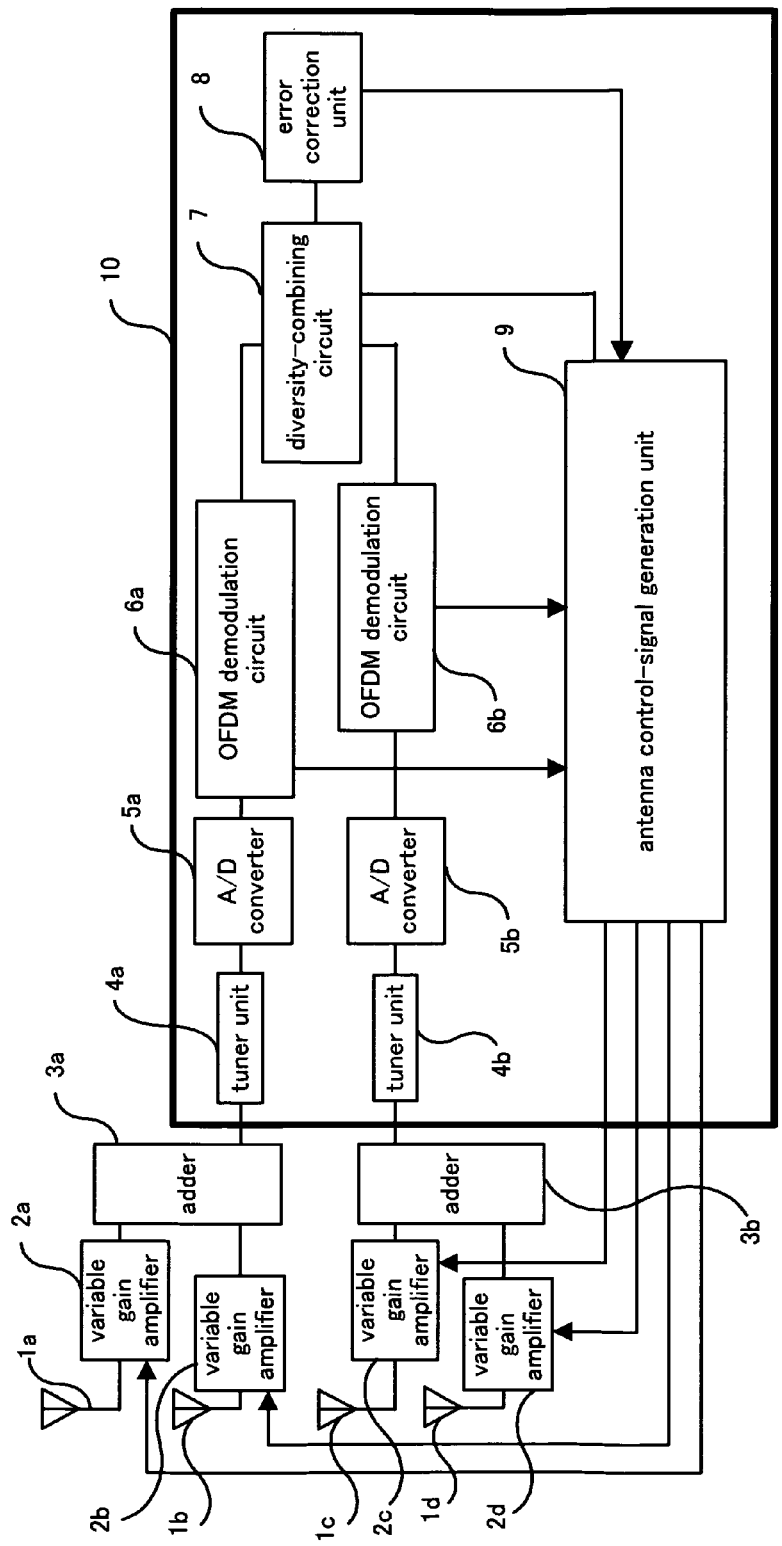
FIG. 1 is a diagram illustrating an overall configuration of a diversity receiver according to Embodiment 1 of the present invention.

FIG. 1 is a diagram illustrating an overall configuration of a diversity receiver according to Embodiment 1 of the present invention.

Referring to FIG. 1, antennas 1a and 1b, which are a plurality of first antennas that receive terrestrial digital broadcast radio waves, are connected to variable gain amplifiers 2a and 2b, respectively, for varying gains of the antennas. The antennas 1a and 1b are such dipole-antennas or pole-antennas that have a figure-eight directional radiation pattern, to have a sufficient reception sensitivity for terrestrial digital broadcast radio waves coming from two directions opposite to each other. The variable gain amplifiers 2a and 2b include attenuators, for example, composed of pin-diodes.

Incidentally, radio waves broadcast from terrestrial digital broadcast stations are basically polarized horizontally whereas vertical polarized components may sometimes be produced under the influences of electromagnetic environments such as buildings themselves or indoor structures.

First reception signals outputted from each variable gain amplifier 2a and 2b are added together by an adder 3a.

The first added reception signal having been added and outputted by the adder 3a, which is a signal of an ultra-high frequency (UHF) band, is converted into a first analog reception signal of an intermediate frequency (IF) band or a base band by a tuner unit 4a.

The first analog reception signal outputted from the tuner unit 4a is then converted into a first digital reception signal by an A/D converter 5a.

The first digital reception signal is demodulated by being subjected to further processes such as a time-domain OFDM (orthogonal frequency division multiplexing) process, an FFT (fast Fourier transformation) process, and a transmission-channel estimation process by an OFDM demodulation circuit 6a, to be outputted as a first demodulation signal.

The above explained configuration composed of the antennas 1a and 1b, the variable gain amplifiers 2a and 2b, the adder 3a, the tuner unit 4a, the A/D converter 5a, and the OFDM demodulation circuit 6a is hereinafter referred to as a first demodulation channel or a first branch.

The diversity receiver according to the invention is further provided with antennas 1c and 1d, which are a plurality of second antennas that receive the terrestrial digital broadcast radio waves.

The antennas 1c and 1d are connected to variable gain amplifiers 2c and 2d, respectively, for varying gains of the antennas.

These antennas are such dipole-antennas or pole-antennas that have a figure-eight directional radiation pattern. The variable gain amplifiers 2c and 2d include attenuators, for example, composed of pin-diodes.

Second reception signals outputted from each variable gain amplifiers 2c and 2d are then added together by an adder 3b.

The second added reception signal having been added and outputted by the adder 3b is converted into a second analog reception signal of an intermediate frequency band or a base band by a tuner unit 4b.

The second analog reception signal outputted from the tuner unit 4b is then converted into a second digital reception signal by an A/D converter 5b.

The second digital reception signal is modulated by being subjected to further processes such as a time-domain OFDM process, an FFT process, and a transmission-channel estimation process by an OFDM demodulation circuit 6b, to be outputted as a second demodulation signal.

The above explained configuration composed of the antennas 1c and 1d, the variable gain amplifiers 2c and 2d, the adder 3b, the tuner unit 4b, the A/D converter 5b, and the OFDM demodulation circuit 6b is hereinafter referred to as a second demodulation channel or a second branch.

Next, the first and second demodulation signals outputted from the first and second branches, respectively, are inputted into a diversity combining circuit 7, to be maximum-ratio-combined. The diversity-combined signal having been diversity-combined by the diversity combining circuit 7 is inputted into an error correction unit 8, to be error-corrected in accordance with the broadcasting system.

An antenna control-signal generation unit 9 generates antenna control signals for controlling the antenna gains, based on reception-power information, delay-profile information, and noise information of the first and second demodulation signals obtained in the OFDM demodulation circuits 6a and 6b of the first and second branches, respectively, and further based on noise information obtained in the diversity combining circuit 7 and error information obtained in the error correction unit 8.

The antenna control signals outputted from the antenna control-signal generation unit 9 are inputted into the variable gain amplifiers 2a and 2b, and 2c and 2d in the first and second branches to control the respective antennas gains, so that the directional radiation patterns for the first and second branches, which are formed by the antennas 1a and 1b, and 1c and 1d of the first and second branches, are controlled.

The above described configuration composed of the tuner units 4a and 4b, the A/D converters 5a and 5b, the OFDM demodulation circuits 6a and 6b, the diversity combining circuit 7, the error correction unit 8, and the antenna control-signal generation unit 9 is hereinafter referred to as a digital signal demodulation unit 10.

Figure 2:
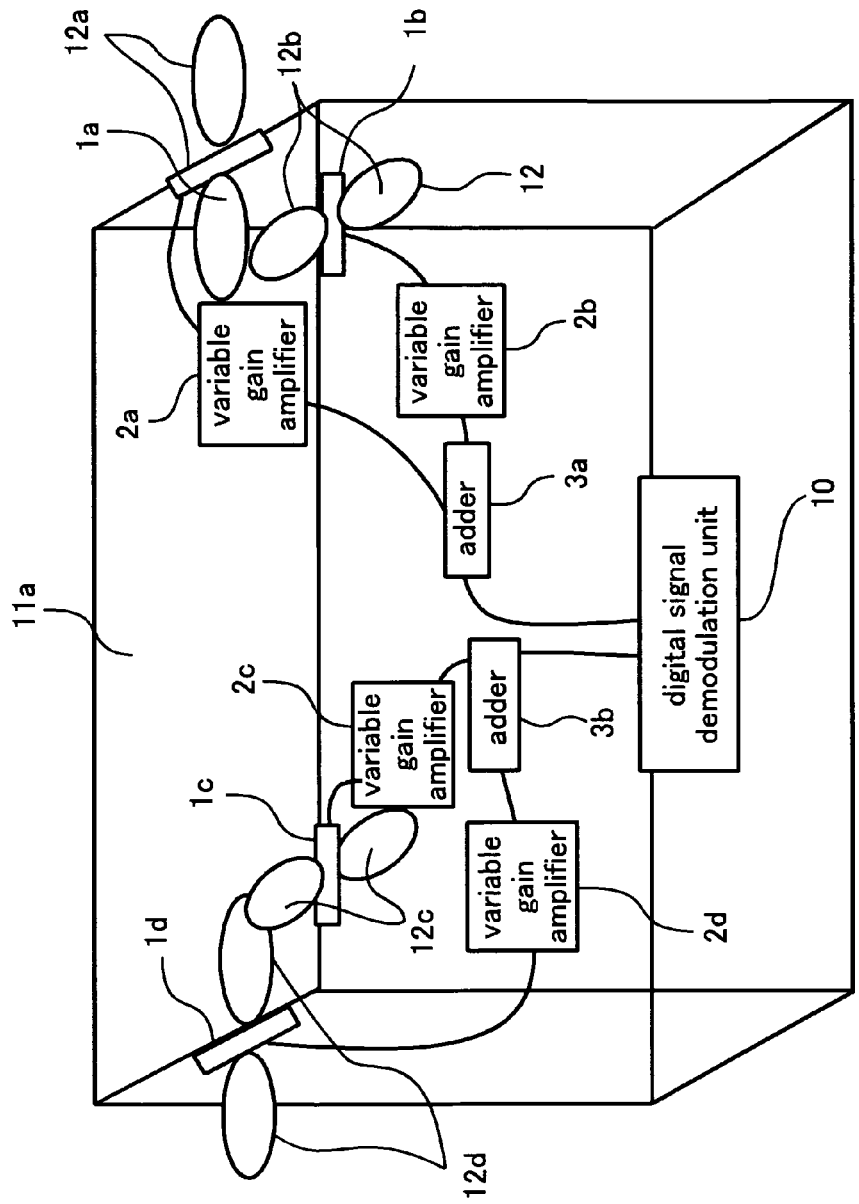
FIG. 2 is a perspective view seen from the rear of a television, and illustrates a configuration example of the diversity receiver incorporated in the television, according to Embodiment 1 of the invention.

FIG. 2 is a perspective view as seen from the rear of a television, and illustrates a configuration example of the diversity receiver incorporated in the television, according to Embodiment 1 of the invention. In addition, since the same reference numerals as those in FIG. 1 denote the same or equivalent components, their explanations will be omitted.

As shown in FIG. 2, seen from the rear of the television, the antennas 1a and 1b of the first branch are mounted on the right end of and on the right side rear end of the top board 11a of the television so that directional radiation patterns 12a and 12b are oriented in the left and right directions and in the front and back directions, respectively.

Similarly, seen from the rear of the television, the antennas 1c and 1d of the second branch are mounted on the left side rear end of and on the left end of the top board 11a of the television so that directional radiation patterns 12c and 12d are oriented in the front and back directions and in the left and right directions, respectively.

Incidentally, the antennas 1a, 1b, 1c, and 1d may be mounted on either the inside or outside of the top board 11a of the television, and all of them are arranged horizontally with respect to the ground.

Figures 3A, 3B:
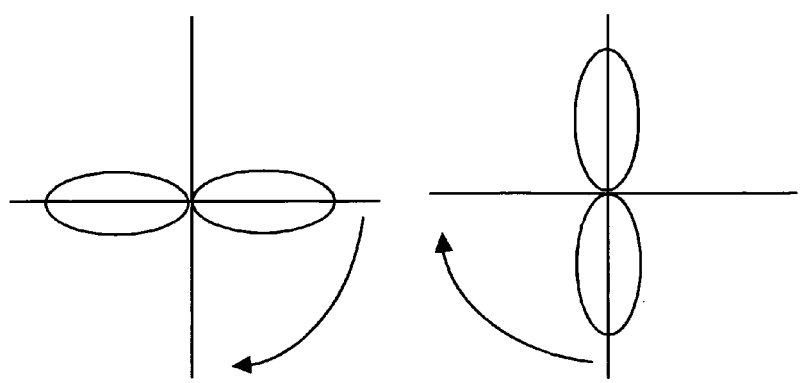
FIGS. 3A and 3B are charts for explaining how directional radiation patterns for antennas are varied by antenna control signals outputted from an antenna control-signal generation unit 9.

FIG. 3 are charts for explaining how directional radiation patterns are varied according to the antenna control signals outputted from the antenna control-signal generation unit 9: FIG. 3A illustrates a movement of the directional radiation patterns formed by the first branch antennas 1a and 1b; and FIG. 3B illustrates a movement of the directional radiation patterns formed by the second branch antennas 1c and 1d. The upward/downward directions and the left/right directions on FIG. 3 correspond to the forward/backward directions and the left/right directions seen from the rear of the television shown in FIG. 2, respectively.

Figure 4:
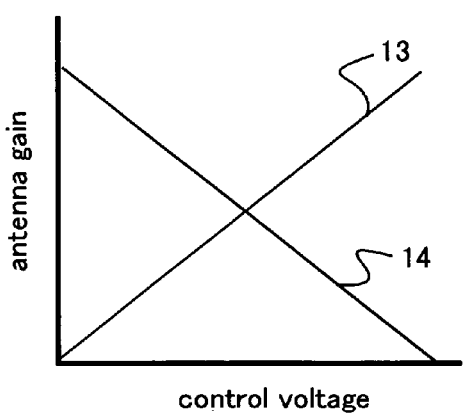
FIG. 4 is a graph showing an example of relationships between control voltages for the antenna control-signal generation unit 9 to control respective gains of variable gain amplifiers 2a, 2b, 2c, and 2d, and gains set by the control voltages.

FIG. 4 is a graph showing an example of relationships between control voltages for the antenna control-signal generation unit 9 to control respective gains of the variable gain amplifiers 2a, 2b, 2c, and 2d, and the gains set by the control voltages: a straight line 13 indicates a relationship between control voltages that control the variable gain amplifiers 2a and 2c for varying the gains of the antennas 1a and 1c, respectively, and the resultant gains thereof; and a straight line 14 indicates a relationship between control voltages that control the variable gain amplifiers 2b and 2d for varying the gains of the antennas 1b and 1d, respectively, and the resultant gains thereof.

Next, an operation of the diversity receiver according to Embodiment 1 of the invention will be explained using FIGS. 1, 2, 3, and 4 in a case of the receiver being incorporated into a television.

In FIG. 1, the variable gain amplifiers 2a, 2b, 2c, and 2d are gain-controlled to vary the gains of the antennas 1a, 1b, 1c, and 1d, respectively, according to the respective antenna control signals outputted from the antenna control-signal generation unit 9.

The variable gain amplifiers 2a and 2c have a relationship based on the straight line 13 indicated in FIG. 2, between the control voltages generated according to antenna control signals and the gains of the antennas 1a and 1c; and the variable gain amplifiers 2b and 2d have a relationship based on the straight line 14 indicated in FIG. 2, between the control voltages generated according to the antenna control signal and the gains of the antennas 1b and 1d.

Here, a directional radiation pattern for the first added reception signal outputted from the adder 3a in the first branch, which is formed by the antennas 1*a* and 1*b* whose gains are controlled by the variable gain amplifiers 2*a* and 2*b*, respectively, is assumed to be oriented in a direction indicated in FIG. 3A. In that case, as shown in FIG. 3B, a direction of a directional radiation pattern of a second added reception signal outputted from the adder 3*b* in the second branch, which is formed by the antennas 1*c* and 1*d* whose gains are controlled by the variable gain amplifiers 2*c* and 2*d*, respectively, has an offset of approximate π/2 (90 degrees) with respect to the direction of the directional radiation pattern for the first added reception signal in the first branch.

With increasing control voltages shown in FIG. 4, the directional radiation pattern for the first added reception signal in the first branch rotates in the clockwise direction as indicated by the arrow in FIG. 3A; and similarly, the directional radiation pattern for the second added reception signal in the second branch also rotates in the clockwise direction as indicated by the arrow in FIG. 3B. On that occasion, the offset between the direction of the directional radiation pattern for the first added reception signal in the first branch and that for the second added reception signal in the second branch is maintained intact at approximately π/2 (90 degrees).

In order to quantitatively analyze an antenna-diversity effect obtained by controlling the gains of the antennas 1*a* and 1*b* in the first branch and those of the antennas 1*c* and 1*d* in the second branch to diversity-combine the first demodulation signal with the second one outputted from the OFDM demodulation circuits 6*a* and 6*b*, respectively, as described above, cumulative probability distributions of reception power values being less than a certain power value are calculated. That is, under the assumption that average noise power is equal between branches, the cumulative probability distributions are estimated in a case of the demodulation signals of the two branches being maximum-ratio-combined.

FIG. 5 are graphs representing cumulative probability distributions of reception power per a predetermined frequency band (25 kHz), measured with a spectrum analyzer, the probability being less than a certain power value, which are the results of a laboratory reception experiment under the condition that every antenna is arranged horizontally with respect to the ground.

Figure 5A:
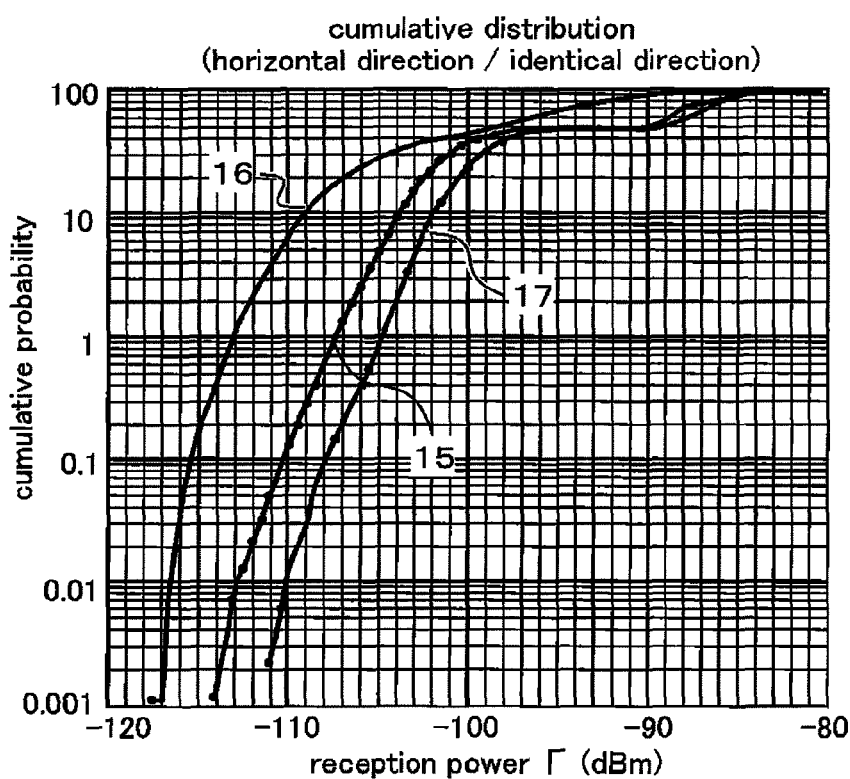
FIGS. 5A and 5B are graphs of cumulative probability distributions indicating that reception power per a predetermined frequency band (25 kHz), measured with a spectrum analyzer, becomes less than a certain power value, which are results of a laboratory reception experiment under the condition that every antenna is arranged horizontally with respect to the ground.

FIG. 5A indicates cumulative probability distributions when the direction of the directional radiation pattern for the first added reception signal in the first branch is identical to that for second added reception signal in the second branch: there indicated are a cumulative probability distribution 15 for the first branch, a cumulative probability distribution 16 for the second branch, and a cumulative probability distribution 17 after the diversity combining.

Figure 5B:
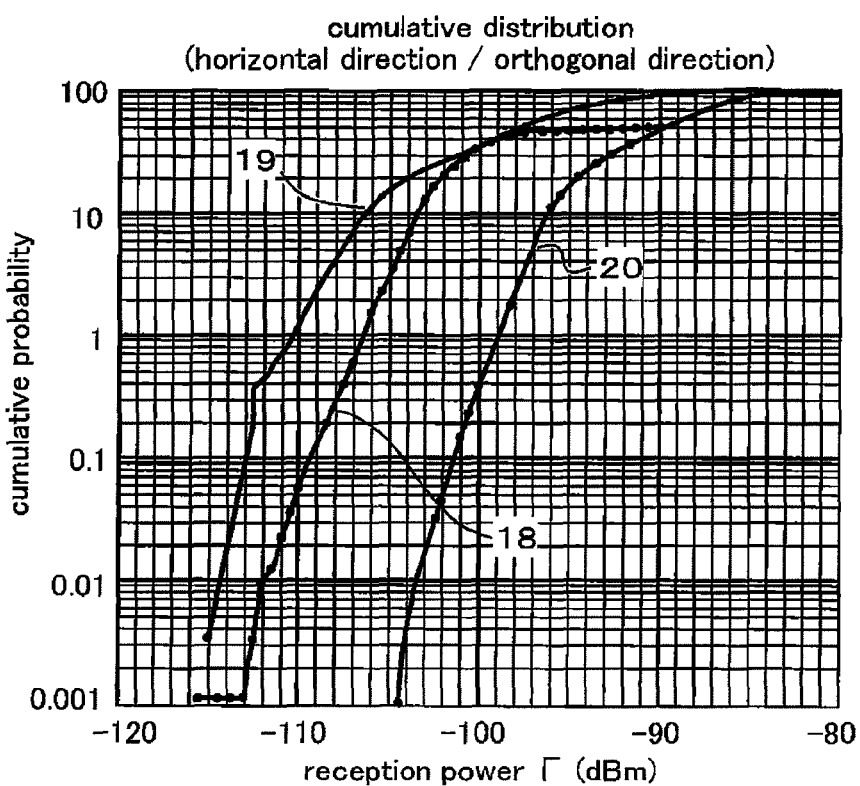

Similarly, FIG. 5B indicates cumulative probability distributions when the direction of the directional radiation pattern for the first added reception signal in the first branch is orthogonal to that for second added reception signal in the second branch: there indicated are a cumulative probability distribution 18 for the first branch, a cumulative probability distribution 19 for the second branch, and a cumulative probability distribution 20 after the diversity combining.

As can be seen by comparing FIG. 5A with FIG. 5B, when the directions of the directional radiation patterns for the added reception signals in each branch are arranged in directions orthogonal to each other rather than in the same direction, the reception power is larger and has a lower probability of the power being less than the certain power value in the cumulative probability after the diversity combining, which implies reception performance is improved.

Thus, by controlling directional radiation patterns for branches, to be orthogonal to each other, a gain after the diversity combining can be improved, bringing about a stable reception.

Next, a control flow of the diversity receiver according to Embodiment 1 of the invention will be explained.

Figure 6:
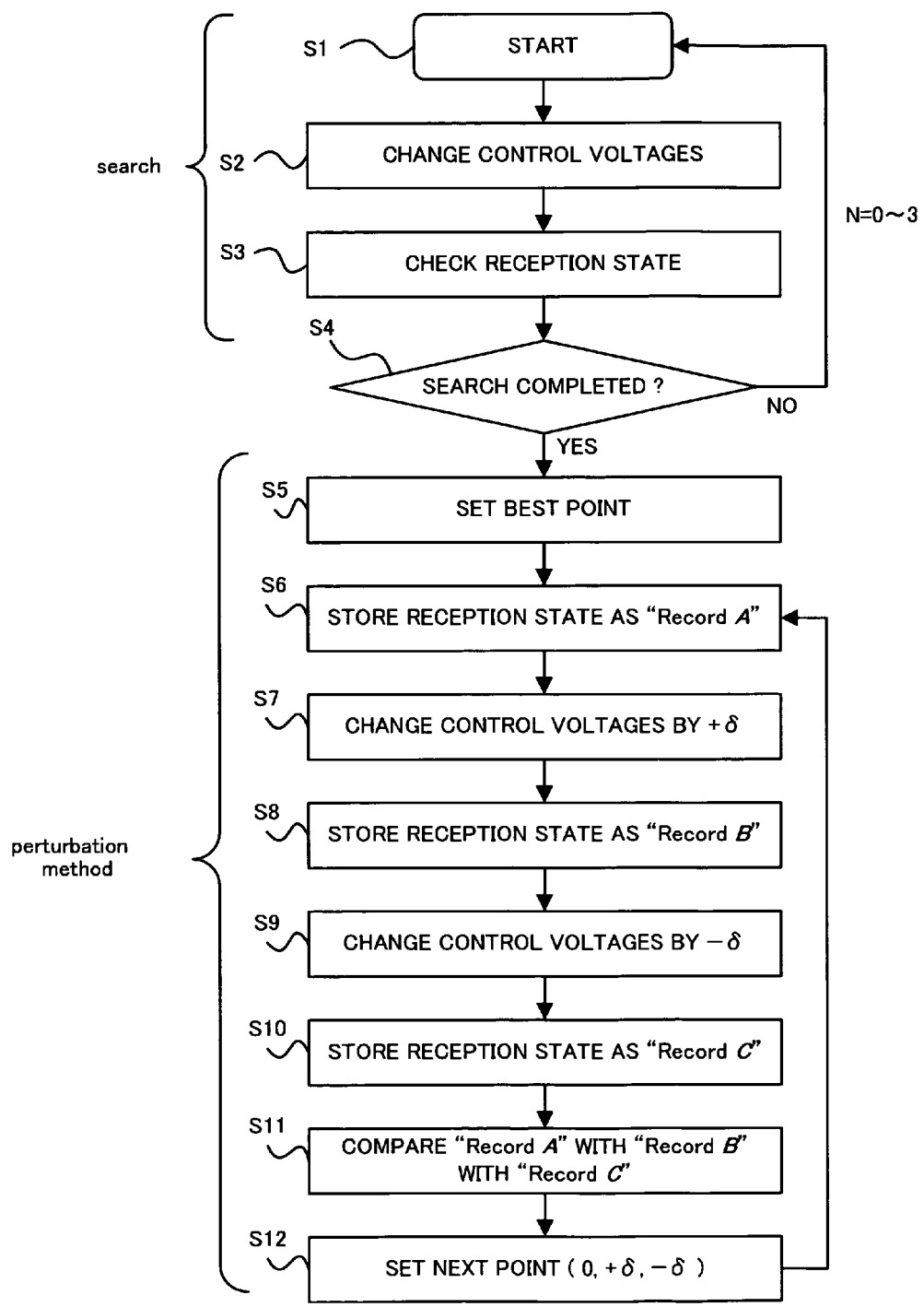
FIG. 6 shows a control flow of the diversity receiver according to Embodiment 1 of the invention.

FIG. 6 is a diagram illustrating a control flow of the diversity receiver according to Embodiment 1 of the invention, in which an example employing a search process and a process using a perturbation method is shown as a basic control algorithm.

To begin with, the control flow starts from Step S1, and executes the following search first. In Step S2, the control voltages shown in FIG. 4 are varied gradually or step by step. In Step S3, reception-power information, delay-profile information, and noise information of each branch, and noise information and error information after the diversity combining are acquired, which are obtained in the digital signal demodulation unit 10, to check a reception state. Step S4 then determines whether the search has been completed. If the search has not been completed, the control flow returns to Step S1. When the search has been completed, control values are temporarily set to a best point as initial values in Step S5.

Next, the reception state obtained from each of the information acquired in the digital signal demodulation unit 10 is stored as "Record A" in Step S6. Subsequently, in Step S7, the control voltages having been set are increased by δ by adding a small amount +δ. In Step S8, a reception state obtained from each of information acquired in the digital signal demodulation unit 10 is stored as "Record B".

In Step S9, the control voltages having been set are decreased by δ by adding a small amount −δ. In Step S10, a reception state obtained from each of information acquired in the digital signal demodulation unit 10 is stored as "Record C".

Then, the stored "Record A", "Record B", and "Record C" are compared with one another in Step S11. Based on the result of the comparison, the old point is substituted by a point estimated to be a better reception state as next initial values in Step S12. After that, the control flow returns to Step S6. The method of setting control values to approach a better reception state by repeating Step S6 through Step S12 as a loop is a control method called perturbation method. Other than this perturbation method, a tracking method according to an LMS (least mean square) algorithm using noise information or error information also brings about the same effect.

By executing such a control flow as described above, a reception state can be pursued up to the best point with keeping the offset between direction of radiation pattern of each branch at approximately π/2.

Moreover, during executing a tracking process using the perturbation method or the LMS algorithm as described above, when either one of the first added reception signal and the second added reception signal that are inputted into the digital demodulation unit 10, for example, the first added reception signal has degraded abruptly due to external noise or fading, by controlling, based on the reception-power information, the delay-profile information, and the noise information that are obtained from the OFDM demodulation circuit 6*a*, the variable gain amplifiers 2*a* and 2*b* in the degrading branch to put the gains of the antennas 1*a* and 1*b* zero so as to isolate the branch and by inputting only the second added reception signal in the second branch, which has not degraded, into the digital signal demodulation unit 10, a reception state after the diversity combining can be recovered.

While the above explanation is made on the case where antennas in a branch are arranged so as to be approximately orthogonal to each other such that the directional radiation patterns for the antennas 1a and 1b are, for example, in the left and right directions and in the front and back directions with respect to a television, respectively, the same effect is obtained as long as antennas have directional patters not necessarily approximately orthogonal to but different from each other.

As described above, a diversity receiver according to Embodiment 1 of the invention is provided with pluralities of first and second variable gain amplifiers each corresponding to pluralities of first and second antennas, respectively, and is configured so as to control the directions of the directional radiation patterns formed by the pluralities of first and second antennas. Thereby, even when the antennas built into a television are arranged close vicinity to each other, a high diversity gain can be obtained.

Moreover, if the antenna control-signal generation unit 9 controls the variable gain amplifiers 2a and 2b, and 2c and 2d in the first and second branches so that the directional radiation patterns for the first and second added reception signals in the first and second branches have directions different from each other, a higher diversity gain can be obtained. In such a case, by further controlling the difference in direction between the directional patterns so as to be approximately $\pi/2$, a noticeably high diversity gain can be obtained.

Furthermore, if the difference in direction between the directional patterns is within a range of $\pi/2\pm\pi/4$, a diversity gain can be ensured to such a level that poses no problem in practical use even in cases of locating a television in a room.

If the difference in direction between the directional patterns can further be limited within a range of $\pi/2\pm\pi/8$, a higher diversity gain can be achieved with some margin in practical use.

In addition, while the above explanation is made on the case in which a diversity combining is performed with a plurality of branches each configured with variable gain amplifiers each provided for a plurality of antennas and with an adder that adds outputs from the variable gain amplifiers, providing variable phase shifters instead of variable gain amplifiers to perform a diversity combining with a plurality of branches each configured with the variable phase shifters and with an adder that adds outputs from the variable phase shifters, a similar effect can also be obtained.

Embodiment 2

While in Embodiment 1 of the invention a diversity receiver has been explained on the case of the antennas having a figure-eight directional radiation pattern, directional antennas having only one direction of radiation pattern may be used.

Figure 7:
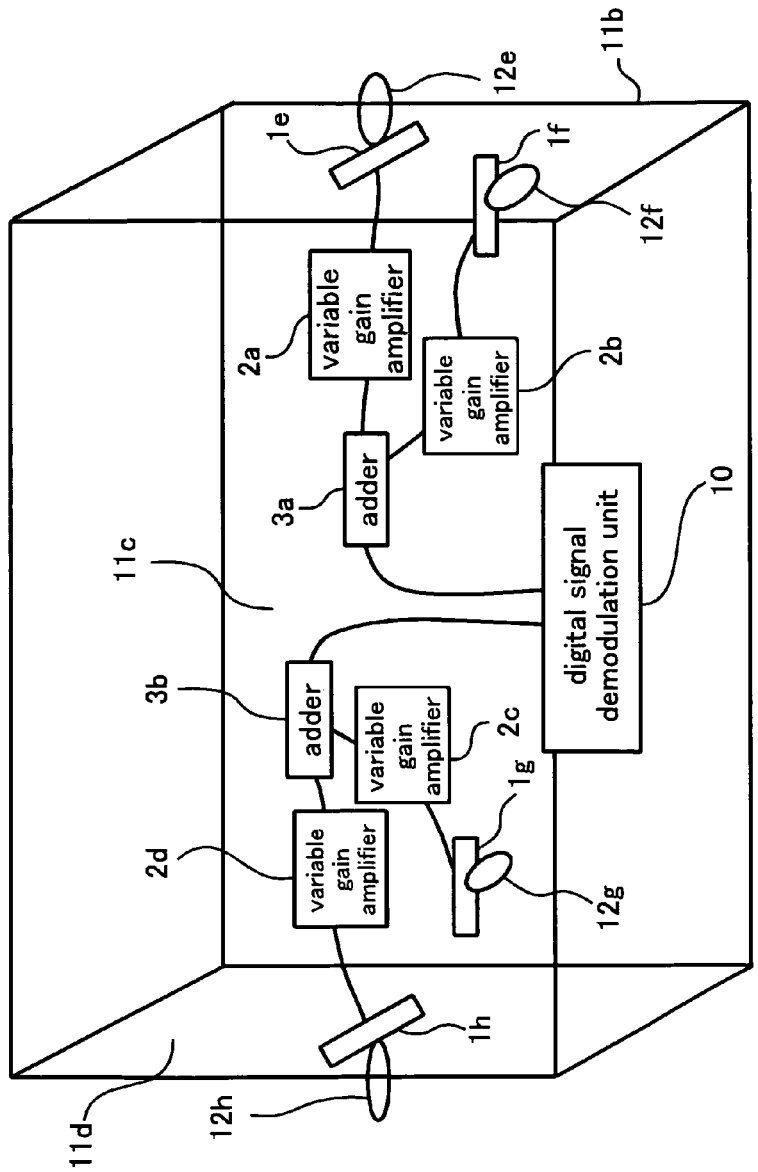
FIG. 7 a perspective view seen from the rear of a television, and illustrates a configuration example of a diversity receiver incorporated in the television in a case of using directional antennas, according to Embodiment 2 of the invention.

FIG. 7 is a perspective view seen from the rear of a television, and illustrates a configuration example of a diversity receiver incorporated in the television in a case of using directional antennas, according to Embodiment 2 of the invention. In addition, since the same reference numerals as those in FIGS. 1 and 2 denote the same or equivalent components, their explanations will be omitted.

As shown in FIG. 7, seen from the rear of the television, an antenna 1e of a first branch is arranged on the right lateral side of the television such that its directional radiation pattern 12e is oriented in the right direction in FIG. 7. Accordingly, for a terrestrial digital broadcast radio wave propagating from the right to the left on FIG. 7, the antenna 1e has a high reception sensitivity, whereas for that propagating from the left to the right, it has only an extremely low reception sensitivity.

Moreover, an antenna 1f of the first branch is mounted on the right of the rear lateral side of the television such that its directional radiation pattern 12f is oriented in the backward direction of the television in FIG. 7. Accordingly, for a terrestrial digital broadcast radio wave propagating from the back to the front in FIG. 7, the antenna 1f has a high reception sensitivity, whereas for that propagating from the front to the back, it has only an extremely low reception sensitivity.

Furthermore, seen from the rear of the television, an antenna 1g of a second branch is mounted on the left of the rear lateral side of the television such that its directional radiation pattern 12g is oriented in the backward direction of the television in FIG. 7; and an antenna 1h of the second branch is mounted on the left lateral side of the television such that its directional radiation pattern 12h is oriented in the left direction on FIG. 7.

Incidentally, the antennas 1e and 1h may be mounted on either inside or outside the lateral sides of a television, and the antennas 1f and 1g may also be mounted on either inside or outside the rear lateral side thereof. In addition, all of them are arranged horizontally with respect to the ground.

Figures 8A, 8B:
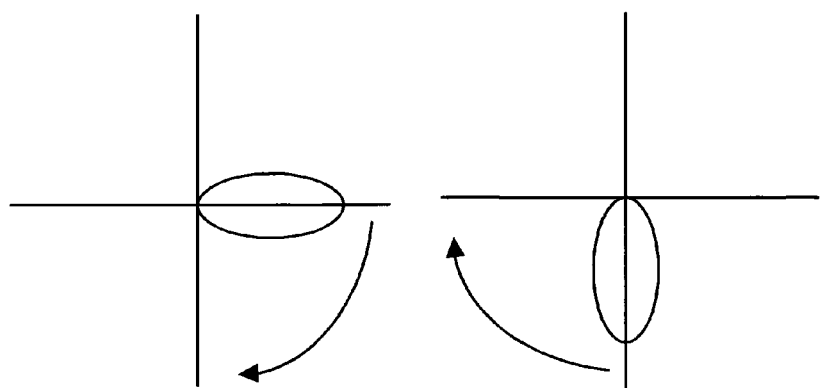
FIGS. 8A and 8B are charts for explaining how directional radiation patterns for antennas are varied according to antenna control signals outputted from the antenna control-signal generation unit 9.

FIG. 8 are charts for explaining how directional radiation patterns are varied according to antenna control signals outputted from an antenna control-signal generation unit 9: FIG. 8A shows a movement of a directional radiation pattern formed by the antennas 1e and 1f of a first branch; FIG. 8B shows a movement of a directional radiation pattern formed by the antennas 1g and 1h of a second branch. The upward/downward directions and the left/right directions on FIG. 8 correspond to the front/back directions and the left/right directions seen from the rear of the television shown in FIG. 7, respectively.

Next, in a television incorporated with the diversity receiver according to Embodiment 2 of the invention, an operation of the diversity receiver will be explained using FIGS. 7 and 8.

A directional radiation pattern for a first added reception signal outputted from an adder 3a in the first branch, which is formed by the antennas 1e and 1f whose gains are controlled by variable gain amplifiers 2a and 2b, respectively, is assumed to be oriented in the direction indicated in FIG. 8A. In that case, as shown in FIG. 8B, a directional radiation pattern for a second added reception signal outputted from an adder 3b in the second branch, which is formed by the antennas 1g and 1h whose gains are controlled by variable gain amplifiers 2c and 2b, respectively, has an offset of approximately $\pi/2$ (90 degrees) with respect to the directional radiation pattern for the first added reception signal in the first branch.

With increasing the control voltages shown in FIG. 4, the directional radiation pattern for the first added reception signal in the first branch rotates in the clockwise direction as indicated by the arrow in FIG. 8A; and similarly, the directional radiation pattern for the second added reception signal in the second branch also rotates in the clockwise direction as indicated by the arrow in FIG. 8B. On that occasion, the offset between the direction of the directional radiation pattern for the first added reception signal in the first branch and that for the second added reception signal in the second branch is maintained intact at approximately $\pi/2$ (90 degrees).

Thus, by controlling directional radiation patterns for each branch, to be orthogonal to each other, a gain after the diversity combining can be improved, bringing about a stable reception.

While the above explanation is made on the case of using directional antennas each having only one direction of radiation pattern, by using omnidirectional antennas the same effect can also be brought about because directivity is produced inside a television having, for example, a liquid crystal panel, electric circuits, or a shield case that serve as shielding objects that block terrestrial digital broadcasting radio waves in the horizontal plane.

Embodiment 3

In Embodiment 1 and Embodiment 2 of the invention, a diversity receiver has a plurality of branches configured with variable gain amplifiers that control gains of a plurality of respective antennas and with adders that add outputs of each variable gain amplifiers so as to diversity-combine demodulated signals of the branches. In Embodiment 3, a diversity receiver has a branch, instead of a branch configured with variable gain amplifiers and an adder, configured with phase combiners that combine received signals of a plurality of antennas with a fixed phase to output a plurality of phase-combined signals and configured with a selection circuit that selects one phase-combined signal from the plurality of phase-combined signals. That configuration can also enhance gains after the diversity combining and bring about a stable reception.

Figure 9:
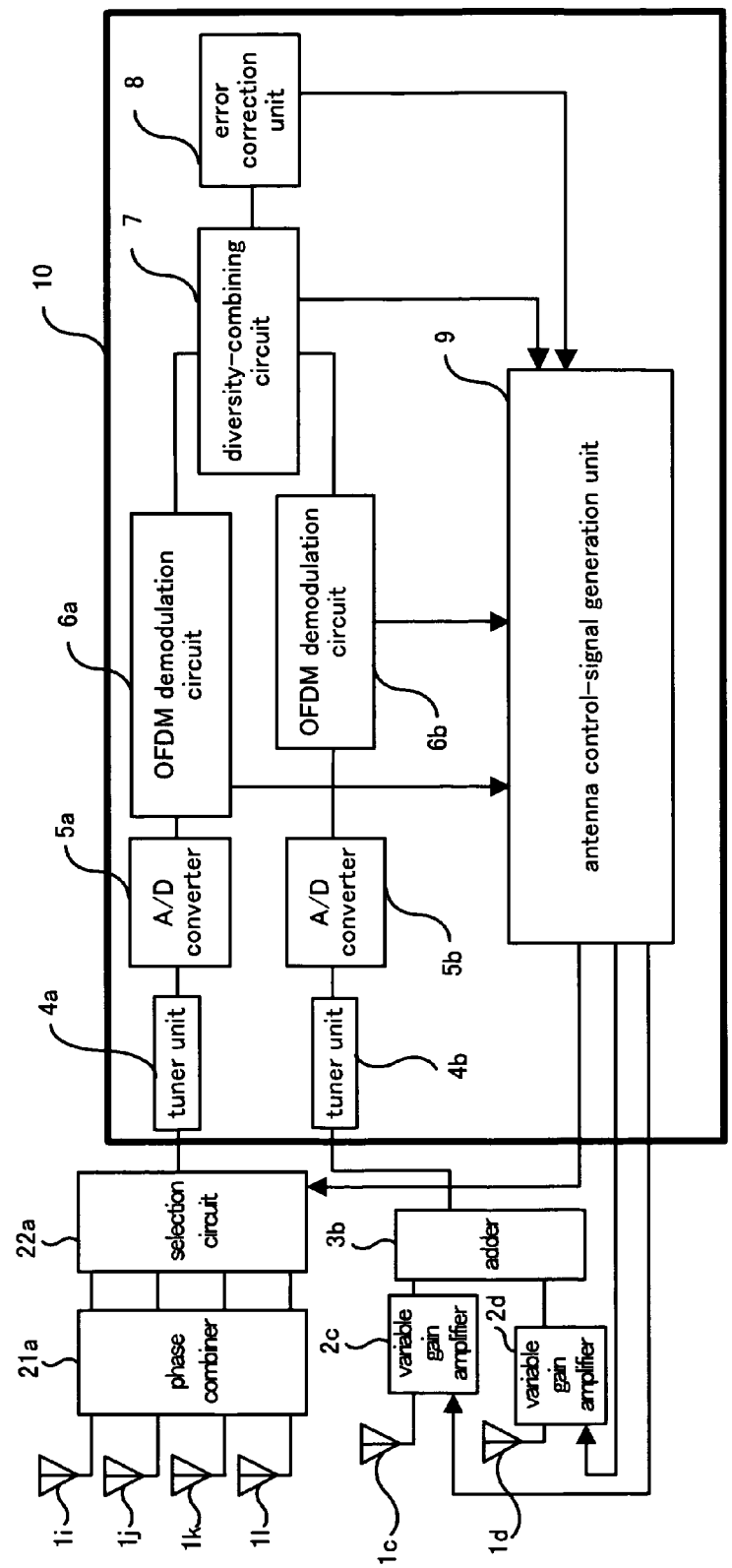
FIG. 9 is a diagram illustrating an overall configuration of a diversity receiver according to Embodiment 3 of the invention.

FIG. 9 is a diagram illustrating an overall configuration of the diversity receiver according to Embodiment 3 of the invention. In addition, since the same reference numerals as those in FIG. 1 denote the same or equivalent components, their explanations will be omitted.

Referring to FIG. 9, a second branch is configured similarly to the diversity receiver of Embodiment 1 and Embodiment 2.

On the other hand, a first branch has, for example, antennas 1i, 1j, 1k, and 1l as a plurality of antennas, and output signals received by each antenna are inputted into a phase combiner 21a, such as a Butler matrix circuit, that combines each output signal with a fixed phase. The phase combiner 21a outputs a plurality of phase-combined signals.

Then, one of the phase-combined signals is selected by a selection circuit 22a from the plurality of phase-combined signals outputted from the phase combiner 21a and is demodulated by an OFDM demodulation circuit 6a through a tuner unit 4a and an A/D converter 5a, to be inputted into a diversity-combining circuit 7 along with an output signal from an OFDM demodulation circuit 6b in the second branch.

Antenna control signals outputted from an antenna control-signal generation unit 9 are inputted into variable gain amplifiers 2c and 2d in the second branch as well as into the selection circuit 22a in the first branch at the same time.

Figure 10:
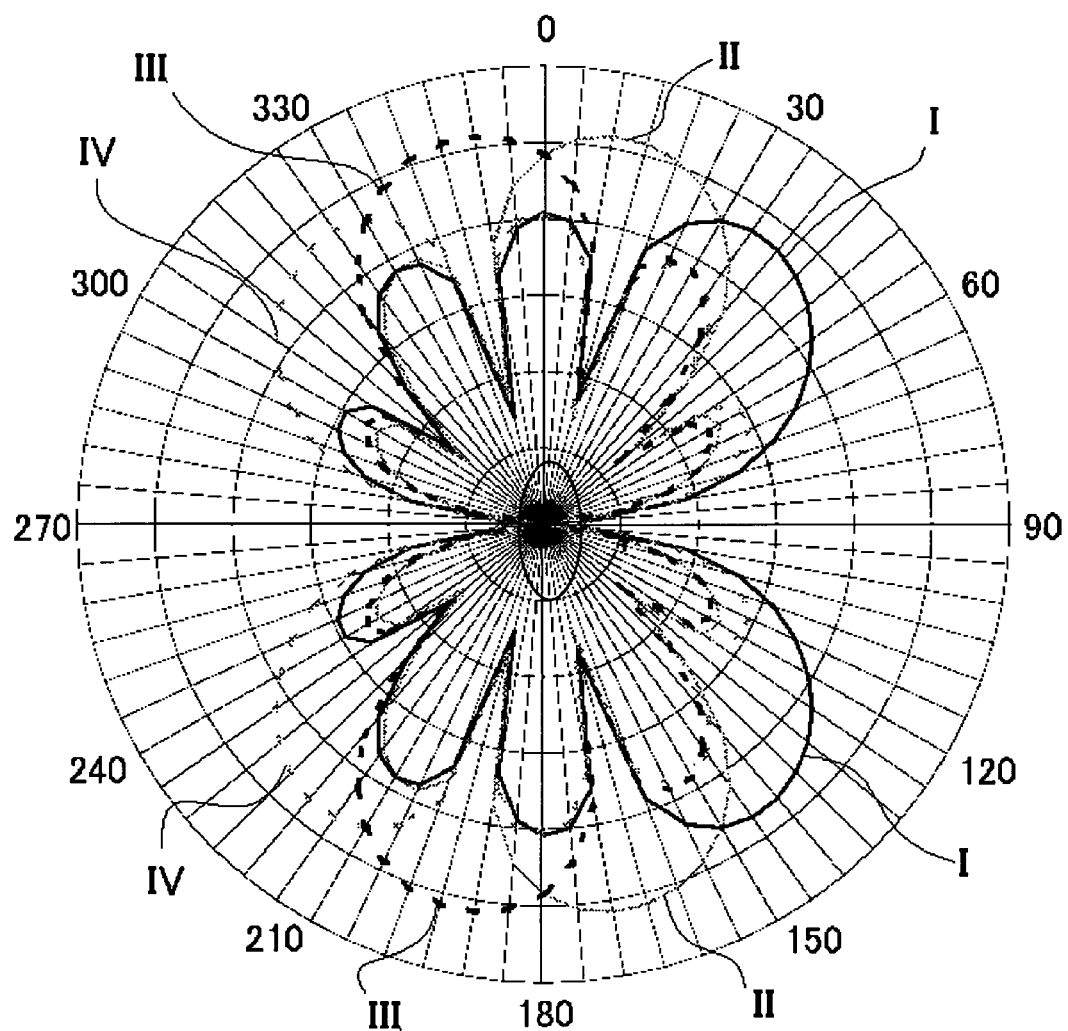
FIG. 10 is a chart showing an example of directional radiation patterns for four outputs of a phase combiner 21 when using equal-length dipole antennas having a figure-eight directional radiation pattern for antennas 1i, 1j, 1k, and 1l, and using a four-input four-output Butler matrix for the phase combiner 21.

FIG. 10 is a chart showing an example of directional radiation patterns for four outputs of a phase combiner 21a when using equal-length dipole antennas having a figure-eight directional radiation pattern for antennas 1i, 1j, 1k, and 1l, and using a four-input four-output Butler matrix for the phase combiner 21a. The directional radiation patterns for the four phase-combined signals outputted from the phase combiner 21a, that is, "Pattern I", "Pattern II", "Pattern III", and "Pattern IV" are depicted in the figure.

Figure 11:
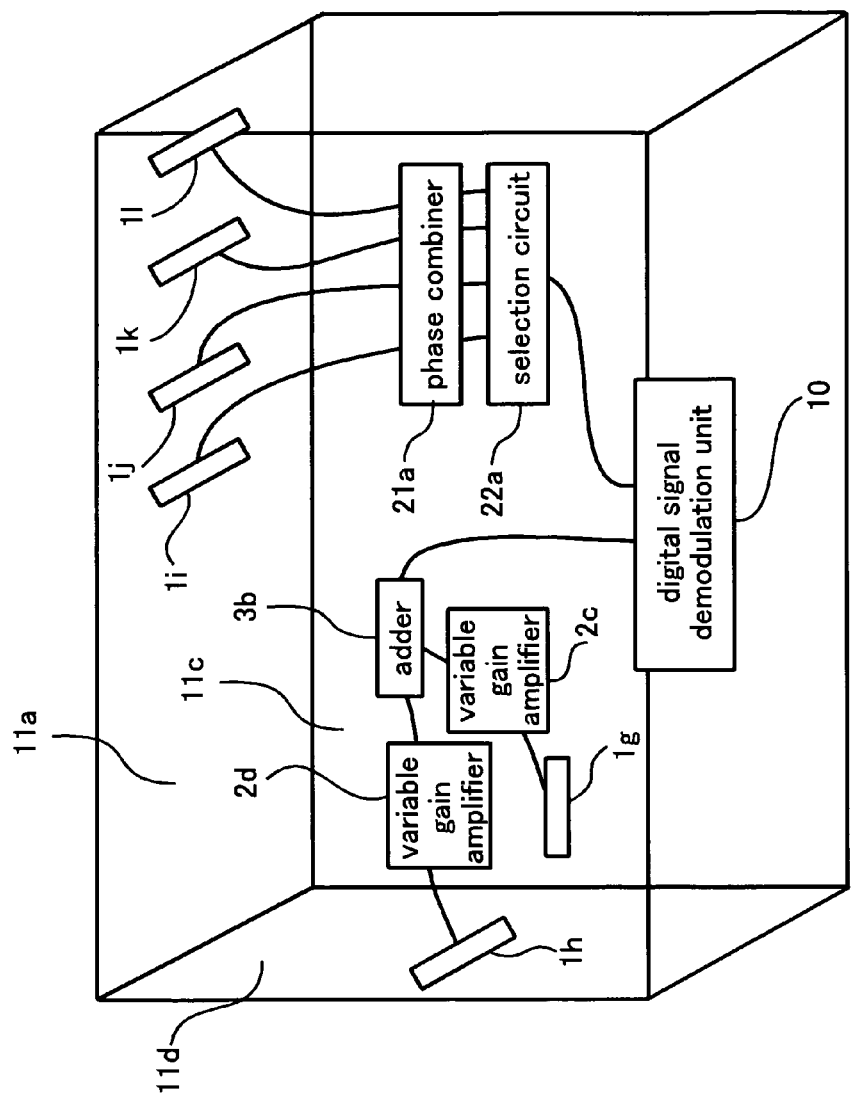
FIG. 11 is a perspective view seen from the rear of a television, and illustrates a configuration example of a diversity receiver incorporated in the television, according to Embodiment 3 of the invention.

FIG. 11 is a perspective view seen from the rear of a television, and illustrates a configuration example of a diversity receiver incorporated in the television, according to Embodiment 3 of the invention. In addition, since the same reference numerals as those in FIG. 2 and FIG. 7 denote the same or equivalent components, their explanations will be omitted.

As shown in FIG. 11, the antennas 1i, 1j, 1k, and 1l of the first branch are mounted on the top board 11a of the television and are arranged in an equally spaced parallel array such that all of their directional radiation patterns are in the left and right directions seen from the rear of the television.

Incidentally, the antennas 1i, 1j, 1k, and 1l may be mounted on either inside or outside the top board 11a of the television, and all of them are arranged horizontally with respect to the ground.

Figure 12:
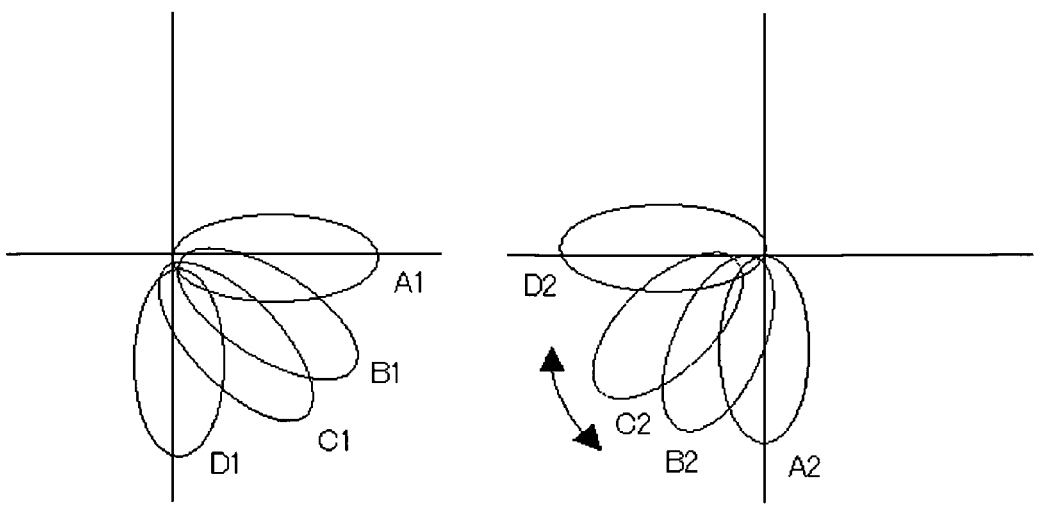
FIGS. 12A and 12B are charts for explaining how directional radiation patterns for antennas are varied by antenna control signals outputted from an antenna control-signal generation unit 9.

FIG. 12 are charts for explaining how directional radiation patterns of antennas are varied according to the antenna control signals outputted from the antenna control-signal generation unit 9 shown in FIG. 9: FIG. 12A illustrates a movement of the directional radiation patterns formed by the antennas 1i, 1j, 1k, and 1l of the fist branch; and FIG. 12B illustrates a movement of directional radiation patterns formed by antennas 1g and 1h of the second branch. The left and right directions on FIG. 12 correspond to the left and right directions seen from the rear of the television shown in FIG. 11.

Next, in a television incorporated with the diversity receiver according to Embodiment 3 of the invention, an operation of the diversity receiver will be explained using FIGS. 9, 10, 11, and 12.

For the phase combiner 21a, a four-input four-output Butler matrix circuit is used here. An original Butler matrix circuit, whereby phase differences among its adjacent output ports are varied in accordance with its signal input ports, is used as a beam forming circuit for an antenna that is able to form a beam oriented in different directions in accordance with the ports to which signals are supplied. In that usage, it is necessary to take into account phase differences due to antenna cables. In the diversity receiver according to embodiment 3 of the invention, however, since the phase combiner 21a is intended for combining signals with a fixed phase, phase differences due to antenna cables are neglected.

Four phase-combined signals each having the directional radiation patterns of "Pattern I", "Pattern II", "Pattern III", and "Pattern IV" as shown in FIG. 10 are outputted from the phase combiner 21a that received signals of the antennas 1i, 1j, 1k, and 1l each are inputted into. As apparent from FIG. 10, directions of the directional patterns are different from one another. Thus, four directions of directional patterns can be realized by directional characteristics of dipole antennas. Moreover, use of a Butler matrix circuit allows their directivity to improve by narrowing these patterns.

While the four phase-combined signals outputted from the phase combiner 21a have the respective four directional patterns shown in FIG. 10, each direction of these four patterns is schematically expressed in a straightforward manner in FIG. 12A by "Pattern A1", "Pattern B1", "Pattern C1", and "Pattern D1". The selection circuit 22a selects one of these patterns based upon the antenna control signals from the antenna control-signal generation unit 9. A phase-combined signal corresponding to the selected pattern is demodulated by the OFDM demodulation circuit 6a through the tuner unit 4a and the A/D converter 5a, to be inputted into the diversity-combining circuit 7.

On the other hand, a directional radiation pattern for a second added reception signal in the second branch, when a directional pattern for the phase-combined signal selected by the selection circuit 22a of the first branch is "Pattern A1", is controlled so as to be "Pattern A2" as shown in FIG. 12B based on the antenna control signals outputted from the antenna control-signal generation unit 9.

Similarly, when a directional pattern for a phase-combined signal selected by the selection circuit 22a of the first branch is "Pattern B1", a directional radiation pattern for a second added reception signal in the second branch is controlled so as to be "Pattern B2"; when the former is "Pattern C1", the latter, "Pattern C2"; and when the former is "Pattern D1", the latter, "Pattern D2".

As can be seen from comparison of FIG. 12A and FIG. 12B, the offset between the direction of the directional pattern for the phase-combined signal selected by the selection circuit $22a$ in the first branch and that for the second added reception signal in the second branch is maintained intact at approximately $\pi/2$ (90 degrees).

Thus, by controlling directional radiation patterns for branches, to be orthogonal to each other, a gain after the diversity combining can be enhanced, bringing about a stable reception.

Next, a control flow of the diversity receiver according to Embodiment 3 of the invention will be explained.

Figure 13:
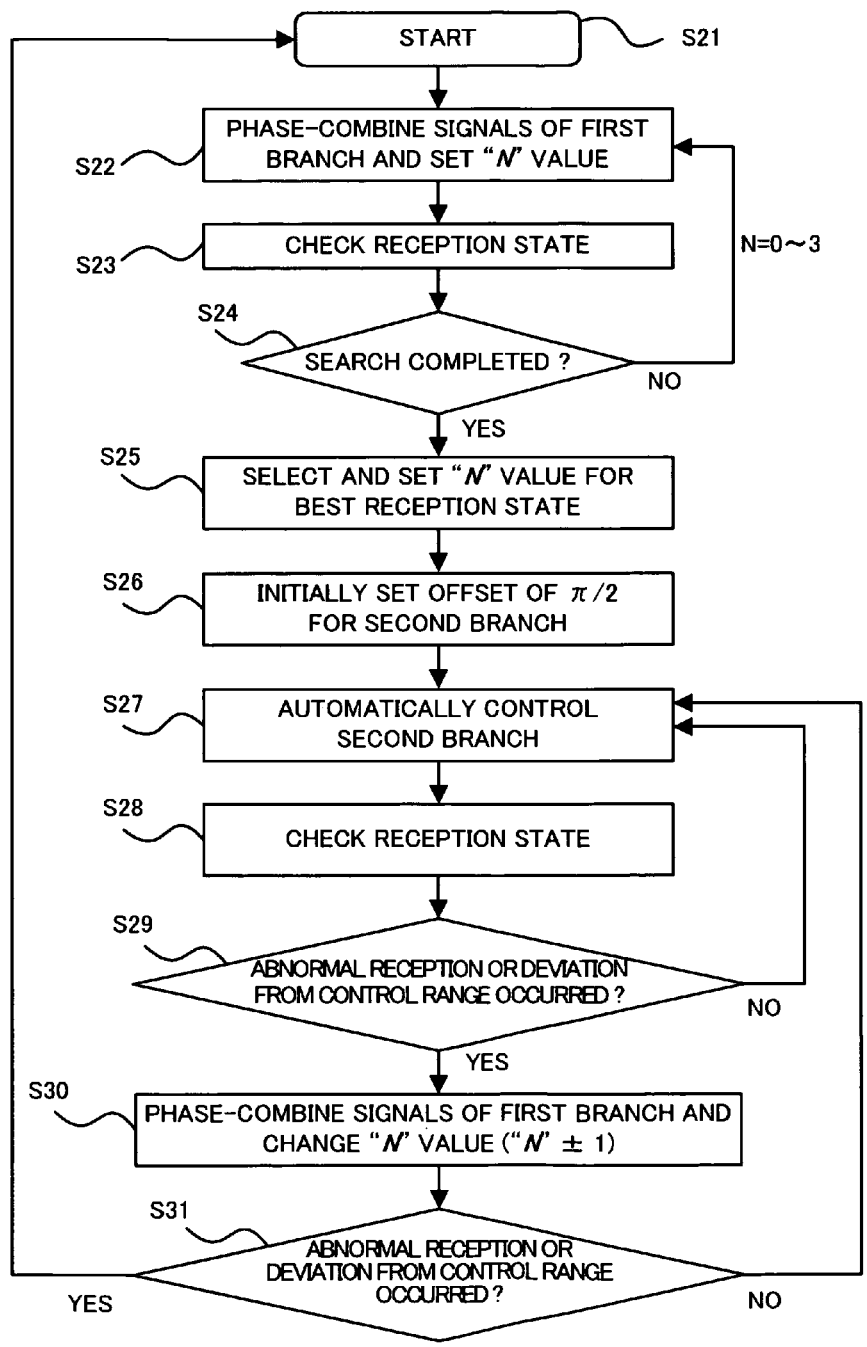
FIG. 13 shows a control flow of the diversity receiver according to Embodiment 3 of the invention.

FIG. 13 shows a control flow of the diversity receiver according to Embodiment 3 of the invention. In the diversity receiver of Embodiment 3, whereas the second branch includes the combination of the variable gain amplifiers and the adder, the first branch includes the combination of the phase combiner $21a$ and the selection circuit $22a$; hence, the control flow in Embodiment 3 differs from that in Embodiment 1.

To begin with, the control flow starts from Step S21, and executes the following search first. An antenna is selected in Step S22 by the selection circuit $22a$ so as to be connected to only one of the four outputs (N=0 to 3) of the four-input four-output phase combiner $21a$ shown in FIG. 11.

In Step S23, with the output of the phase combiner $21a$, corresponding to the connected input, being inputted into a digital signal demodulation unit 10, reception-power information, noise information, and delay-profile information of the first branch are acquired, which are obtained in the digital signal demodulation unit 10, to check a reception state.

Subsequently, Step S24 determines whether the search has been completed. Since the phase combiner $21a$ has four outputs in the example of Embodiment 3, the search is to be completed with an "N" value being set to zero, one, two, and three in order. If the search has not been completed, the control flow returns to Step S22. When the search has been completed, an "N" value outputted by the phase combiner $21a$, which indicates a best reception state based on the result of the search, is selected and set by the selection circuit $22a$ in Step S25.

Since the phase combiner $21a$ has a function capable of narrowing directional radiation patterns for antennas, so that a terrestrial digital broadcast radio wave coming from a specific direction can be effectively received, the diversity receiver of Embodiment 3 is advantageous particularly for a case with existence of a long delay path caused by an SFN (single frequency network), reflection from mountains or the like.

Next, in Step S26, control voltages for the variable gain amplifiers $2c$ and $2d$ in the second branch are initially set so that the direction of the directional radiation pattern for the second branch has an offset of approximately $\pi/2$ with respect to that in the first branch.

Furthermore, in Step S27, when the directional radiation pattern for the first branch shifts in direction, the control voltages for the variable gain amplifiers $2c$ and $2d$ in the second branch are varied to automatically control the offset between the directions of the directional radiation patterns for the first and second branches so as to be kept at approximately $\pi/2$.

Then, in Step S28, reception-power information, delay-profile information, noise information for each branch, and noise information and error information after the diversity combining, which are obtained in the digital signal demodulation unit 10, are acquired to check a reception state.

Step S29 determines whether an abnormal reception or a deviation from the control range occurs or not, based on each of the information acquired in Step S28. While no such failure occurs, the control flow returns to Step S27. If such failure occurs, the "N" value currently selected by the selection circuit $22a$ in the first branch is changed to another value of $N\pm1$ to be outputted from the phase combiner $21a$ in Step S30.

Furthermore, after acquiring each of information obtained in the digital signal demodulation unit 10, Step S31 determines whether an abnormal reception or a deviation from the control range occurs or not based on the information. While no such failure occurs, the control flow returns to Step S27. If such failure occurs, the control flow returns to Step S21 to execute the series of steps from the beginning.

In the control flow described above, the perturbation method or the LMS algorithm also work effectively as a control algorithm.

As described above, a diversity receiver according to Embodiment 3 of the invention, since it includes a plurality of branches one of which is configured with a phase combiner that combines output signals of a plurality of antennas with a fixed phase to output a plurality of phase-combined signals and with a selection circuit that selects one phase-combined signal from the plurality of phase-combined signals, can enhance a gain after the diversity combining, so that a stable reception can be brought about. Moreover, since directional radiation patterns can be narrowed using the phase combiners, the diversity receiver is immune to interference and advantageous particularly when a long delay path exists.

In addition, in the above description, the selection circuit in the first branch, which is configured with the combination of the phase combiner and the selection circuit, is controlled first, and then the variable gain amplifiers in the second branch, which is configured with the combination of the variable gain amplifiers and the adder, are controlled. However, controlling the second branch first and then controlling the selection circuit in the first branch to select a phase combiner output whose offset is closest to $\pi/2$, the same effect can also be obtained.

Embodiment 4

In the diversity receiver according to Embodiment 3 of the invention, the explanation has been made on the case where the first branch is configured in such a way that the four equal-length dipole antennas having a figure-eight directional radiation pattern are arranged on the top board of a television in parallel at equal intervals; the output signals of these antennas are inputted into the four-input four-output phase combiner; and an output of the phase combiner is selected by the selection circuit. As opposed to that, if a first branch is configured in such a way that a plurality of directional antennas each having only one direction of radiation pattern is used as antennas to be arranged on the top board of a television in directions different from one another and one of output signals of these antennas is selected by a selection circuit, a diversity receiver can be realized that not only enhances a gain after the diversity combining but also is easy to assemble with a low part count and a low cost.

Figure 14:
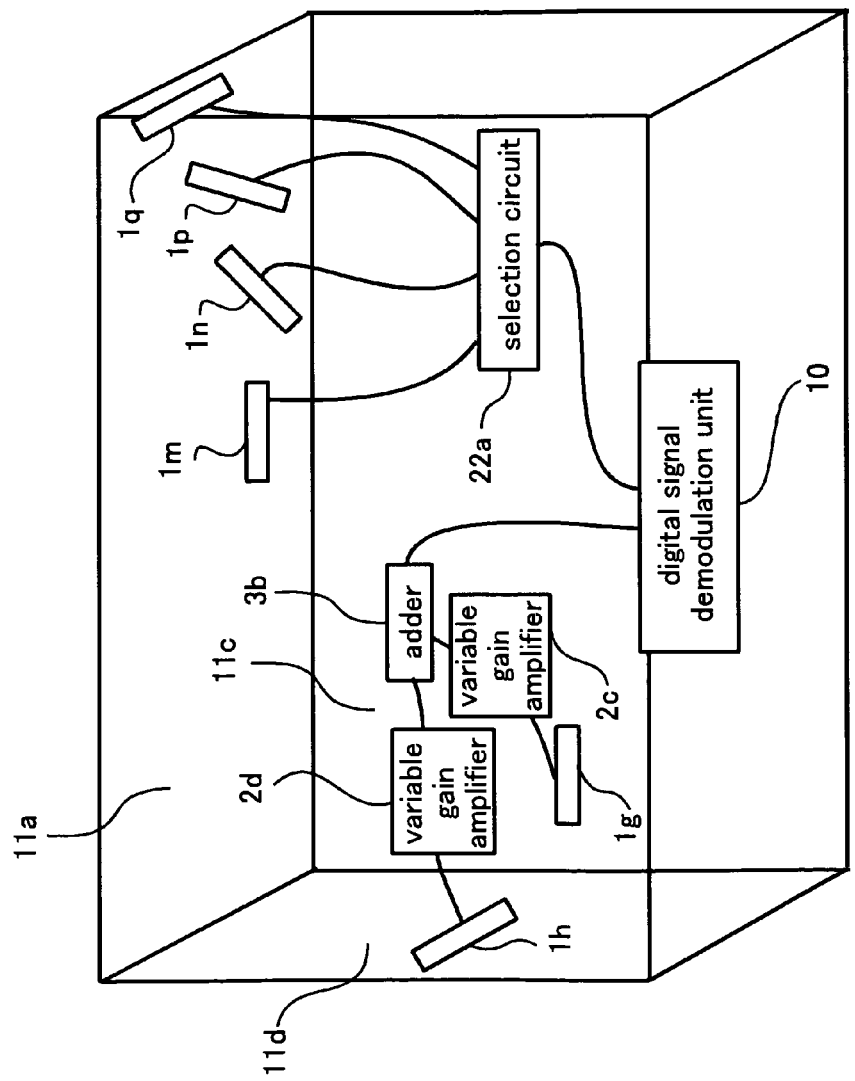
FIG. 14 is a perspective view seen from the rear of a television, and illustrates a configuration example of a diversity receiver incorporated in the television, according to Embodiment 4 of the invention.

FIG. 14 is a perspective view seen from the rear of a television, and illustrates a configuration example of a diversity receiver incorporated in the television, according to Embodiment 4 of the invention. In addition, since the same reference numerals as those in FIG. 2, FIG. 7, and FIG. 11 denote the same or equivalent components, their explanations will be omitted.

As shown in FIG. 14 seen from the rear of the television, antennas 1m, 1n, 1p, and 1q of a first branch are arranged on the top board 11a of the television so that their directions of directional radiation patterns are different from one another.

As a specific example, a directional radiation pattern for the antenna 1m is oriented at an angle of zero (0 degrees), that of the antenna 1n, of $\pi/6$ (30 degrees), that of the antenna 1p, of $\pi/3$ (60 degrees), and that of the antenna 1m, of $\pi/2$ (90 degrees) with respect to the backward direction of the television in FIG. 14.

Output signals received by the antennas 1m, 1n, 1p, and 1q are selected by a selection circuit 22a, so that a selected one is inputted into a digital signal demodulation unit 10.

Incidentally, the antennas 1m, 1n, 1p, and 1q may be mounted on either inside or outside the top board 11a of the television, and all of them are arranged horizontally with respect to the ground.

The diversity receiver of Embodiment 4 differs from that of Embodiment 3 only in the directional patterns of antennas, the antenna arrangement, and the presence or absence of a phase combiner in the first branch, but its operation and control flow are similar to those of Embodiment 3.

As described above, eliminating the necessity of a phase combiner by using directional antennas, a diversity receiver can be realized that not only enhances a gain after the diversity combining but also is easy to assemble with a low part count and a low cost.

Embodiment 5

In the diversity receiver according to Embodiment 3 of the invention, the explanation has been made on the case where the first branch is configured in such a way that the four equal-length dipole antennas having a figure-eight directional radiation pattern are arranged on the top board of a television in parallel at equal intervals; output signals of these antennas are inputted into the four-input four-output phase combiner; and an output of the phase combiner is selected by the selection circuit. In addition, the second branch in Embodiment 3, similar to that of the diversity receivers in Embodiment 1 and embodiment 2, is configured with the variable gain amplifiers that control respective gains of the plurality of antennas and the adder that adds the outputs of the variable gain amplifiers.

As opposed to that, a second branch may be configured, similarly to a first branch, in such a way that four equal-length dipole antennas having a figure-eight directional radiation pattern arranged on the top board of a television in parallel at equal intervals; output signals of these antennas are inputted into a four-input four-output phase combiner; and an output of the phase combiner is selected by a selection circuit.

Figure 15:
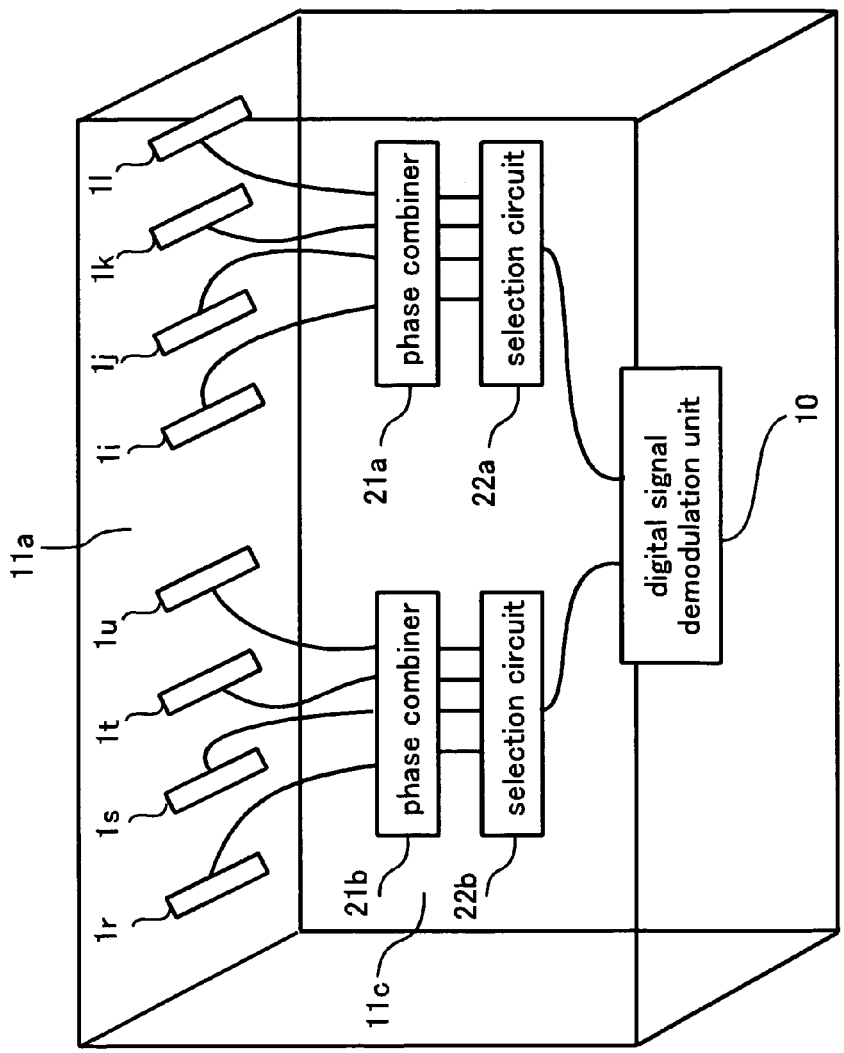
FIG. 15 is a perspective view seen from the rear of a television, and illustrates a configuration example of a diversity receiver incorporated in the television, according to Embodiment 5 of the invention.

FIG. 15 is a perspective view seen from the rear of a television, and illustrates a configuration example of a diversity receiver incorporated in the television, according to Embodiment 5 of the invention. In addition, since the same reference numerals as those in FIG. 2, FIG. 7, FIG. 11, and FIG. 14 denote the same or equivalent components, their explanations will be omitted.

All antennas 1r, 1s, 1t, and 1u of a second branch are, similarly to antennas 1i, 1j, 1k, and 1l of a first branch, equal-length dipole antennas having a figure-eight directional radiation pattern. As shown in FIG. 15, the antennas of the second branch each are arranged at positions different from those of the antennas of the first branch, on the top board 11a of a television in parallel at equal intervals.

A phase combiner 21b is set so that its fixed phase is shifted by approximately $\pi/2$ from that of a phase combiner 21a. Moreover, based on antenna control signals outputted from an antenna control-signal generation unit 9, a selection circuit 22a in the first branch and a selection circuit 22b in the second branch are controlled so that the difference becomes closest to $\pi/2$ between the direction of a directional radiation pattern for a phase-combined signal selected by the selection circuit 22a from phase-combined signals outputted the phase combiner 21a and that for a phase-combined signal selected by the selection circuit 22b from phase-combined signals outputted the phase combiner 21b.

A diversity receiver according to Embodiment 5 of the invention, since it is configured as described above, can enhance a gain after the diversity combining and realize a stable reception. Moreover, since directional radiation patterns can be narrowed using a phase combiner, the diversity receiver is immune to interference and advantageous particularly when a long delay path exists.

Embodiment 6

In the diversity receiver according to Embodiment 5 of the invention, the explanation has been made on the case where the first and second branches each are configured in such a way that the four equal-length dipole antennas having a figure-eight directional radiation pattern arranged on the top board of a television in parallel at equal intervals; output signals of the antennas are inputted into the four-input four-output phase combiner; and outputs of the phase combiner are selected by the selection circuit.

As opposed to that, with a first branch being configured in such a way that four equal-length dipole antennas having a figure-eight directional radiation pattern arranged on the top board of a television in parallel at equal intervals, output signals of these antennas are inputted into a four-input four-output phase combiner, and an output of the phase combiner is selected by a selection circuit; a second branch may be configured in such a way that a plurality of directional antennas each having only one direction of radiation pattern is used to be arranged on the top board of the television in directions different from one another, and outputs of these antennas are selected by a selection circuit.

Figure 16:
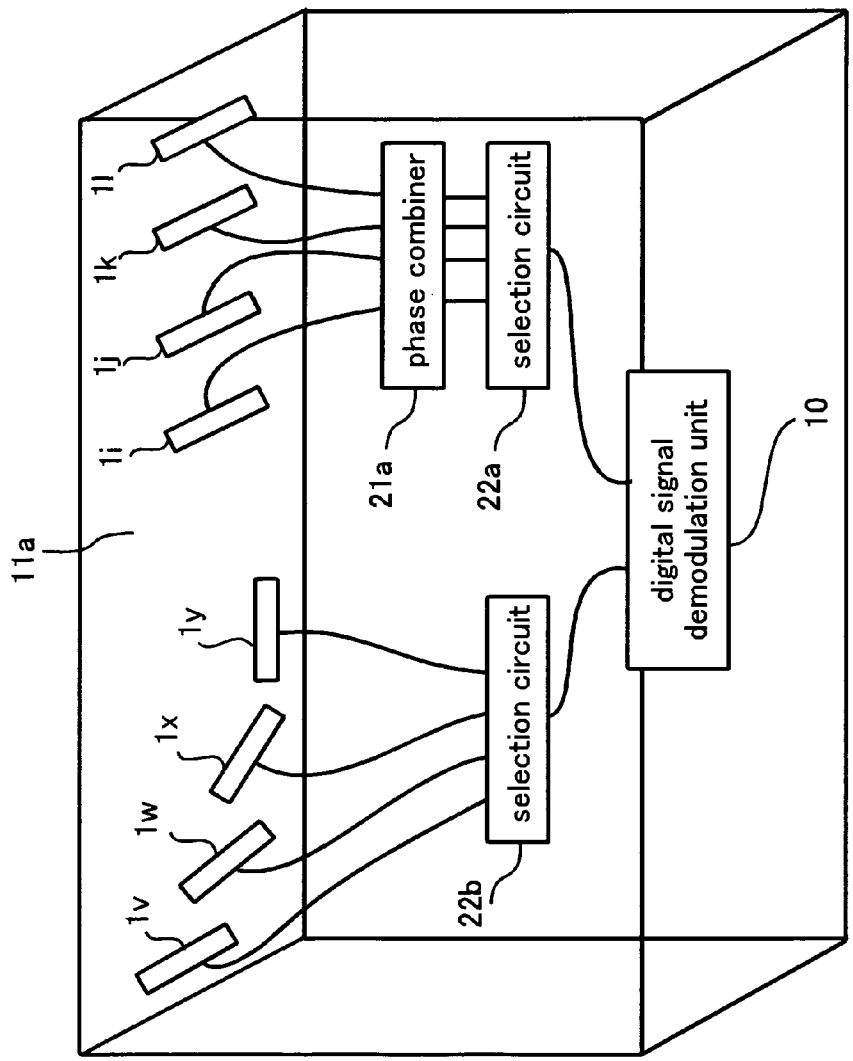
FIG. 16 is a perspective view seen from the rear of a television, and illustrates a configuration example of a diversity receiver incorporated in the television, according to Embodiment 6 of the invention.

FIG. 16 is a perspective view seen from the rear of a television, and illustrates a configuration example of a diversity receiver incorporated in the television, according to Embodiment 6 of the invention. In addition, since the same reference numerals as those in FIG. 2, FIG. 7, FIG. 11, FIG. 14, and FIG. 15 denote the same or equivalent components, their explanations will be omitted.

In FIG. 16, all antennas 1i, 1j, 1k, and 1l of a first branch are equal-length dipole antennas having a figure-eight directional radiation pattern. As shown in FIG. 16, the antennas of the first branch each are arranged in parallel at equal intervals on the right of the top board 11a of a television viewed from the rear of the television.

Similarly, all antennas 1v, 1w, 1x, and 1y of a second branch are directional antennas having only one direction of radiation pattern. The antennas of the second branch each are arranged on the left of the top board 11a of the television so that their directions of the directional radiation patterns differ from one another.

A selection circuit 22a in the first branch and a selection circuit 22b in the second branch are controlled, based on antenna control signals outputted from an antenna control-signal generation unit 9, so that the difference becomes closest to $\pi/2$ between the direction of a directional radiation pattern for an output signal of an antenna selected by the selection circuit 22a and that for an output signal of an antenna selected by the selection circuit 22b.

A diversity receiver according to Embodiment 6 of the invention, since it is configured as described above, can be realized that not only enhances a gain after the diversity combining but also eliminates a phase combiner in the second branch, which makes it easy to assemble the receiver with a low part count and a low cost.

Embodiment 7

In the diversity receiver according to Embodiment 6 of the invention, the explanation has been made on the case where the first branch is configured in such a way that the four equal-length dipole antennas having a figure-eight directional radiation pattern are arranged on the top board of a television in parallel at equal intervals, received signals of these antennas are inputted into the four-input four-output phase combiner, and an output of the phase combiner is selected by the selection circuit; the second branch is configured in such a way that the plurality of directional antennas each having only one direction of radiation pattern is used to be arranged on the top board of the television in directions different from one another, and one of received signals of these antennas is selected by the selection circuit in the second branch.

As opposed to that, with a first and second branch each being configured in such a way that a plurality of directional antennas each having only one direction of radiation pattern is used to be arranged on the top board of a television in directions different from one another and one of signals received by these antennas are selected by a selection circuit in the respective branches, a diversity receiver can be realized that not only enhances a gain after the diversity combining but also eliminates phase combiners at all, which makes it easy to assemble the receiver with a lower part count and a low cost.

Figure 17:
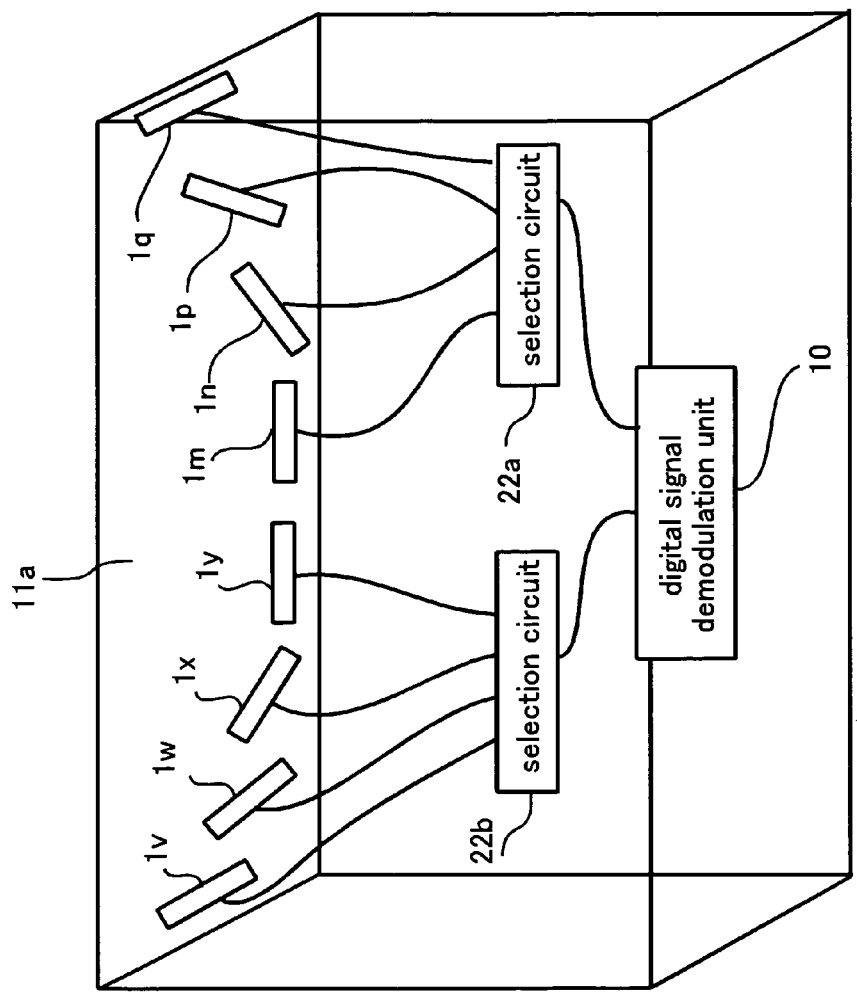
FIG. 17 is a perspective view seen from the rear of a television, and illustrates a configuration example of a diversity receiver incorporated in the television, according to Embodiment 7 of the invention.

FIG. 17 is a perspective view seen from the rear of a television, and illustrates a configuration example of a diversity receiver incorporated in the television, according to Embodiment 7 of the invention. In addition, since the same reference numerals as those in FIG. 2, FIG. 7, FIG. 11, FIG. 14, FIG. 15, and FIG. 16 denote the same or equivalent components, their explanations will be omitted.

In FIG. 17, antennas 1m, 1n, 1p, and 1q of a first branch and antennas 1v, 1w, 1x, and 1p of a second branch are directional antennas each having only one direction of radiation pattern.

As shown in FIG. 17 seen from the rear of a television, every antenna of the first branch is arranged on the right of the top board 11a of the television so that their directional radiation patterns differ from one another. Similarly, every antenna of the second branch is arranged on the left of the top board 11a of the television so that their directional radiation patterns differ from one another.

A selection circuit 22a in the first branch and a selection circuit 22b in the second branch are controlled, based on antenna control signals outputted from an antenna control-signal generation unit 9, so that the difference becomes closest to π/2 between the direction of a directional radiation pattern for a specified phase-combined signal selected by the selection circuit 22a from output signals from each antenna of the first branch and that for a specified phase-combined signal selected by the selection circuit 22b from output signals from each antenna of the second branch.

A diversity receiver according to Embodiment 7 of the invention, since it is configured as described above, can be realized that not only enhances a gain after the diversity combining but also eliminates a phase combiner at all, which makes it easy to assemble the receiver with a lower part count and a low cost.

Embodiment 8

In the diversity receiver according to Embodiment 1 through Embodiment 7 of the invention, all the antennas are arranged horizontally with respect to the ground. This is due to the fact that terrestrial digital broadcast radio waves that carry TV programs are polarized horizontally. When receiving a terrestrial digital radio wave indoors, however, the polarization plane of the incoming wave is varied due to effects of windows, wall reflection, room size, and the like, resulting in an incidence of vertical components. Vertically polarized components stronger than horizontally polarized ones may even be produced at a certain position in a room depending on positional relationships of standing waves. Hence, tilting antennas from the horizontal so as to be able to receive both horizontally and vertically polarized radio waves, a diversity gain can be enhanced.

Figure 18:
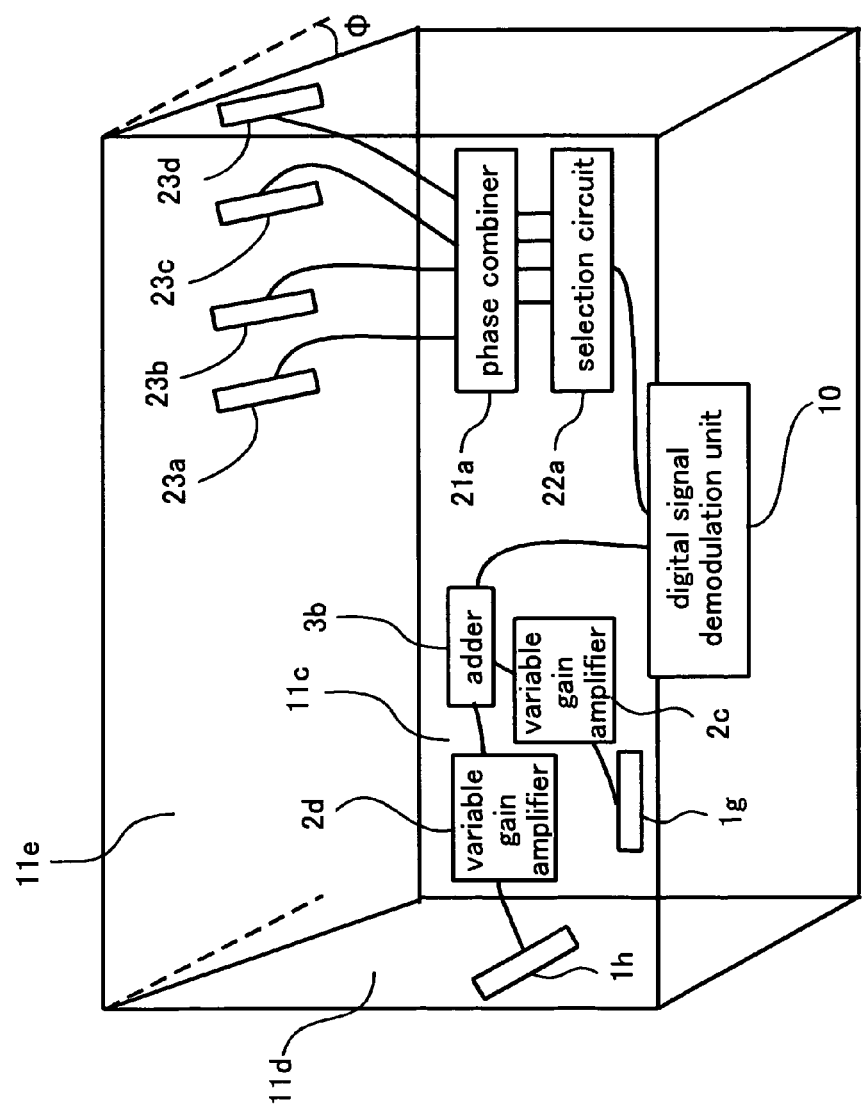
FIG. 18 is a perspective view seen from the rear of a television, and illustrates a configuration example of a diversity receiver incorporated in the television, according to Embodiment 8 of the invention.

FIG. 18 is a perspective view seen from the rear of a television, and illustrates a configuration example of a diversity receiver incorporated in the television, according to Embodiment 8 of the invention. In addition, since the same reference numerals as those in FIG. 2, FIG. 7, FIG. 11, FIG. 14, FIG. 15, FIG. 16, and FIG. 17 denote the same or equivalent components, their explanations will be omitted.

As shown in FIG. 18, every antenna 23a, 23b, 23c, and 23d of a first branch is arranged on the top board 11e of the television in an equally spaced parallel array such that their directional radiation patterns are in the right and left directions seen from the rear of the television. It is noted that the top board 11e, different from the top board 11a of a television mentioned in Embodiment 1 through 7, slopes down by an angle φ toward the rear side. Accordingly, the antennas 23a, 23b, 23c, and 23d are tilted by the angle φ with respect to the horizontal plane. Except for that point, the television is the same as a television that incorporates the diversity receiver explained in Embodiment 3.

As a result, the antennas 23a, 23b, 23c, and 23d can receive not only a horizontally polarized terrestrial digital broadcast radio wave coming without variation in the polarization plane but also a vertically polarized wave produced by variation of the polarization plane for the reason described above. Therefore, even when the television is located at a location in a room where an intense vertically-polarized wave is produced, reception performance can be improved.

Figure 19A:
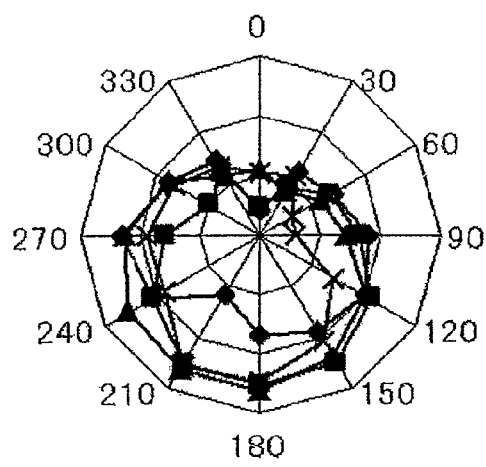
FIGS. 19A and 19B are charts showing an example of directional radiation patterns for four outputs of a four-input four-output phase combiner 21 in a first branch.
Figure 19:
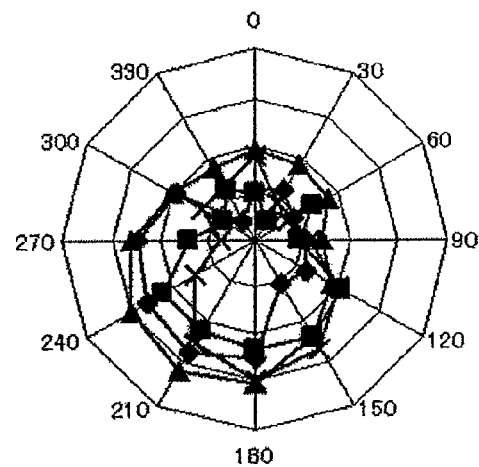

FIG. 19 are charts showing an example of directional radiation patterns for the four outputs of a four-input four-output phase combiner 21a in a first branch shown in FIG. 18: FIGS. 19A and 19B represent the directional patterns when receiving a horizontally polarized radio wave and when receiving a vertically polarized radio wave, respectively. Incidentally, four kinds of symbols in the figures correspond to the four outputs of the phase combiner 21a, respectively.

It is understood from FIG. 19A that the directional patterns vary for the horizontally polarized radio wave, and is also understood from FIG. 19B that the reception sensitivity is ensured for the vertically polarized radio wave and the directional patterns vary therefor.

As described above, by arranging antennas to be tilted obliquely from the horizontal, reception power can be ensured even under a state in which the polarization plane of a terrestrial digital broadcast radio wave is varied to intensify a vertically polarized component depending on an indoor electromagnetic environment, realizing a diversity receiver capable of enhancing its diversity gain.

While the above explanation has been made on the case in which dipole or directional antennas are used for the antennas of the first branch, antennas such as helical antennas that can receive circularly polarized waves may be used therefor.

Figure 20:
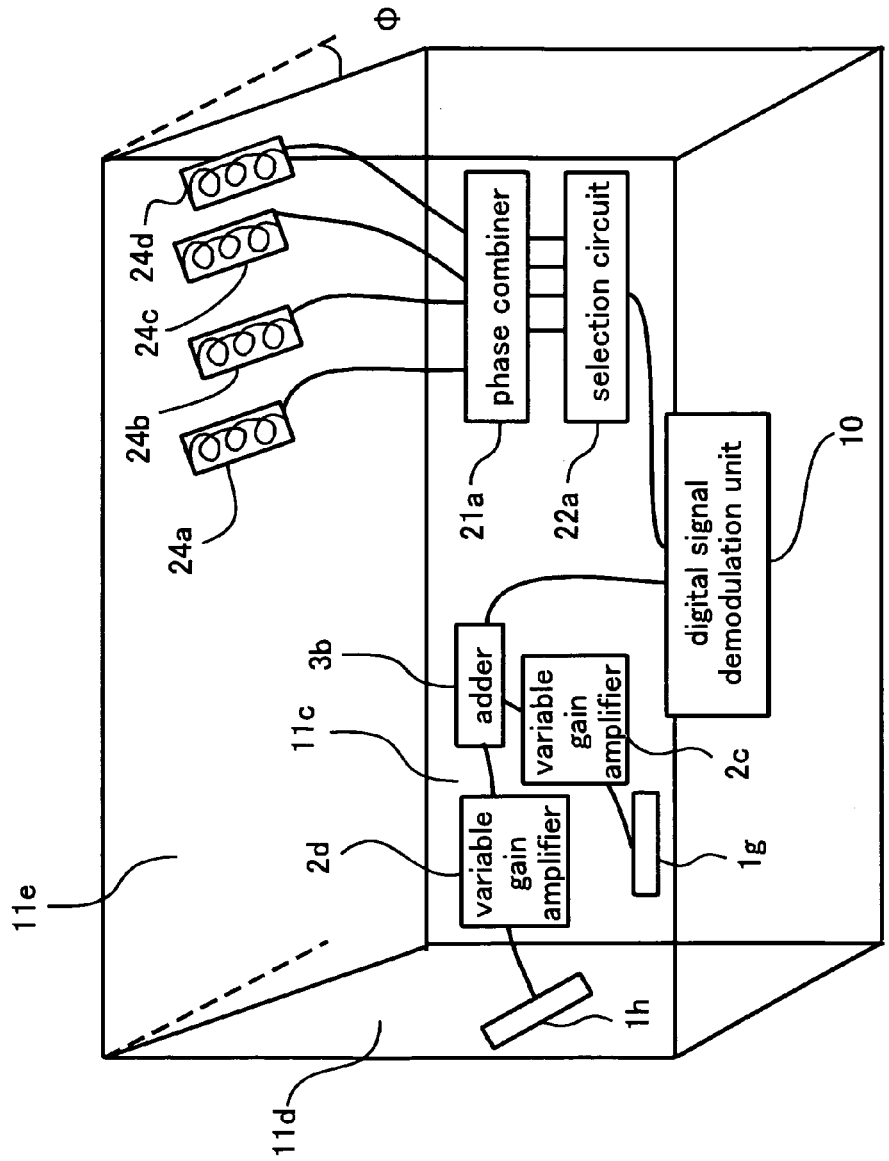
FIG. 20 is a perspective view seen from the rear of a television, and illustrates a configuration example of a diversity receiver incorporated in the television in a case of using helical antennas in the first branch.

FIG. 20 is a perspective view seen from the rear of a television, and illustrates a configuration example of a diversity receiver incorporated in the television in a case of using helical antennas in the first branch. In addition, since the same reference numerals as those in FIG. 2, FIG. 7, FIG. 11, FIG. 14, FIG. 15, FIG. 16, FIG. 17, and FIG. 18 denote the same or equivalent components, their explanations will be omitted.

Antennas 24a, 24b, 24c, and 24d of the first branch are helical antennas having reception sensitivity to circularly polarized waves.

As described above, since a diversity receiver according to the present invention has reception sensitivity also to a circularly polarized wave produced by variation of the polarization plane of a terrestrial digital broadcast radio wave depending on an indoor electromagnetic environment, a diversity receiver can be realized that ensures its diversity gain in response to various indoor electromagnetic environments.

In addition, while a diversity receiver according to the present invention has been explained above in the case of being incorporated in a television, even when it is incorporated in a device other than a television, a terrestrial digital broadcast recorder, as long as the device receives terrestrial digital broadcasts, the same effects can be brought about as a matter of course.

What is claimed is:

1. A diversity receiver comprising:
a plurality of first antennas having directional radiation patterns different from one another, for receiving a horizontally polarized broadcast radio signal;
a plurality of first variable gain amplifiers provided for said respective first antennas, for adjusting respective gains thereof;
a first adder for adding first reception signals having been received by said first antennas and gain-adjusted by said first variable gain amplifiers, to output the first added reception signal;
a plurality of second antennas having directional radiation patterns different from one another, arranged in positions different from those of said first antennas, for receiving the horizontally polarized broadcast radio signal;
a plurality of second variable gain amplifiers provided for said respective second antennas, for adjusting respective gains thereof;
a second adder for adding second reception signals having been received by said second antennas and gain-adjusted by said second variable gain amplifiers, to output the second added reception signal;
a diversity-combining circuit for diversity-combining signals based on the first and second added reception signals, to output the diversity-combined signal; and
an antenna control unit for controlling said pluralities of first and second variable gain amplifiers so that a difference between the directions of the directional radiation patterns for the first and second added reception signals maintain a predefined range.

2. The diversity receiver of claim 1, wherein the difference between the directions of the directional radiation patterns for the first and second added reception signals is within a range of $\pi/2\pm\pi/4$.

3. The diversity receiver of claim 1, wherein the difference between the directions of the directional radiation pattern for the first and second added reception signals is within a range of $\pi/2\pm\pi/8$.

4. The diversity receiver of claim 1, wherein the difference between the directions of directional radiation patterns for the first and second added reception signals is approximately $\pi/2$.

5. The diversity receiver of claim 1, wherein said first and/or second antennas are arranged tilted with respect to the horizontal plane, for receiving vertically polarized broadcast radio signals.

6. The diversity receiver of claim 1, wherein said antenna control unit controls on the basis of first reception-power information, first delay-profile information, and first noise information that are obtained based on the first reception added signal; second reception-power information, second delay-profile information, and second noise information that are obtained based on the second added reception signal; and third noise information and error information that are obtained based on the diversity-combined signal.

7. A diversity receiver comprising:
a plurality of first antennas having directional radiation patterns different from one another, for receiving a horizontally polarized broadcast radio signal;
a selection circuit for selecting a specific output signal from signals each inputted thereinto from said first antennas:
a plurality of second antennas having directional radiation patterns different from one another, arranged in positions different from those of said first antennas, for receiving the horizontally polarized broadcast radio signal;
a plurality of variable gain amplifiers provided for said respective second antennas, for adjusting respective gains thereof;
an adder for adding reception signals having been received by said second antennas and gain-adjusted by said variable gain amplifiers, to output the second added reception signal;
a diversity-combining circuit for diversity-combining signals based on the specific output signal and the added signal, to output the diversity-combined signal; and
an antenna control unit for controlling said variable gain amplifiers as well as said selection circuit.

8. A diversity receiver comprising:
a plurality of first antennas for receiving a horizontally polarized broadcast radio signal;
a phase combiner for combining signals each inputted from said first antennas with a fixed phase, to output the plurality of phase-combined signals;
a selection circuit for selecting a specific phase-combined signal from the phase-combined signals;
a plurality of second antennas having directional radiation patterns different from one another, arranged in positions different from those of said first antennas, for receiving the horizontally polarized broadcast radio signal;
a plurality of variable gain amplifiers provided for said respective second antennas, for adjusting respective gains thereof;
an adder for adding reception signals having been received by said second antennas and gain-adjusted by said variable gain amplifiers, to output the added reception signal;

a diversity-combining circuit for diversity-combining signals based on the specific phase-combined signal and the added reception signal, to output the diversity-combined signal; and an antenna control unit for controlling said selection circuit as well as said variable gain amplifiers.

9. The diversity receiver of claim 7, wherein said antenna control unit controls so that directions of directional radiation patterns for the specific phase-combined signal selected by said selection circuit and the added reception signal become different from each other.

10. The diversity receiver of claim 9, wherein said antenna control unit controls so that the difference becomes approximately $\pi/2$ between the directions of the directional radiation patterns for the specific phase-combined signal and the added reception signal.

11. The diversity receiver of claim 7, wherein said antenna control unit controls on the basis of first reception-power information, first delay-profile information, and first noise information that are obtained based on the specific phase-combined signal selected by the selection circuit; second reception-power information, second delay-profile information, and second noise information that are obtained based on the added reception signal; and third noise information and error information that are obtained based on the diversity-combined signal.

12. A diversity receiver comprising:
a plurality of first antennas for receiving a horizontally polarized broadcast radio signal;
a first phase combiner for combining signals each inputted from said first antennas with a first fixed phase, to output the plurality of first phase-combined signals;
a first selection circuit for selecting a first specific phase-combined signal from the first phase-combined signals;
a plurality of second antennas arranged in positions different from those of said first antennas, for receiving the horizontally polarized broadcast radio signal;
a second phase combiner for combining signals each inputted from said second antennas with a second fixed phase, to output the plurality of second phase-combined signals;
a second selection circuit for selecting a second specific phase-combined signal from the second phase-combined signals;
a diversity-combining circuit for diversity-combining signals based on the first and second specific phase-combined signals, to output the diversity-combined signal; and
an antenna control unit for controlling said first and second selection circuits.

13. The diversity receiver of claim 12, wherein said antenna control unit controls so that directions of directional radiation patterns for the first and second specific phase-combined signals selected by said first and second selection circuit, respectively, become different from each other.

14. The diversity receiver of claim 13, wherein said antenna control unit controls so that the difference becomes close to $\pi/2$ between the directions of the directional radiation patterns for the first and second specific phase-combined signals selected by said first and second selection circuit, respectively.

15. The diversity receiver of claim 12, wherein said antenna control unit controls on the basis of first reception-power information, first delay-profile information, and first noise information that are obtained based on the first phase-combined signal selected by said first selection circuit; second reception-power information, second delay-profile information, and second noise information that are obtained based on the second phase-combined signal selected by said second selection circuit; and third noise information and error information that are obtained based on the diversity-combined signal.

16. A diversity receiver comprising:
a plurality of first antennas for receiving a horizontally polarized broadcast radio signal;
a phase combiner for combining signals each inputted from said first antennas with a first fixed phase, to output the plurality of phase-combined signals;
a first selection circuit for selecting a specific phase-combined signal from the phase-combined signals;
a plurality of second antennas arranged in positions different from those of said first antennas, for receiving the horizontally polarized broadcast radio signal;
a second selection circuit for selecting a specific second-antenna output signal, from signals each inputted thereinto from said second antennas;
a diversity-combining circuit for diversity-combining signals based on the specific phase-combined signal and the specific second-antenna output signal, to output the diversity-combined signal; and
an antenna control unit for controlling said first and second selection circuits.

17. The diversity receiver of claim 16, wherein said antenna control unit controls so that the directions of directional radiation patterns for the specific phase-combined signal selected by said first selection circuit and the specific second-antenna output signal selected by said second selection circuit become different from each other.

18. The diversity receiver of claim 17, wherein said antenna control unit controls so that the difference becomes close to $\pi/2$ between the directions of the directional radiation patterns for the specific phase-combined signal selected by said first selection circuit and the specific second-antenna output signal selected by said second selection circuit.

19. The diversity receiver of claim 16, wherein said antenna control unit controls on the basis of first reception-power information, first delay-profile information, and first noise information that are obtained based on the specific phase-combined signal selected by said first selection circuit; second reception-power information, second delay-profile information, and second noise information that are obtained based on the specific second-antenna output signal selected by said second selection circuit; and third noise information and error information that are obtained based on the diversity-combined signal.

20. A diversity receiver comprising:
a plurality of first antennas for receiving a horizontally polarized broadcast radio signal;
a first selection circuit for selecting a specific first-antenna output signal, from signals inputted thereinto from said first antennas;
a plurality of second antennas arranged in positions different from those of said first antennas, for receiving the horizontally polarized broadcast radio signal;
a second selection circuit for selecting a specific second-antenna output signal, from signals inputted thereinto from said second antennas;
a diversity-combining circuit for diversity-combining signals based on the specific first-antenna output signal and the specific second-antenna output signal, to output the diversity-combined signal; and
an antenna control unit for controlling said first and second selection circuits so that a difference between the directions of directional radiation patterns for the specific first-antenna output signal selected by said first selection circuit and the specific second-antenna output signal selected by said second selection circuit maintains a predefined range.

21. The diversity receiver of claim 20, wherein said antenna control unit controls so that the difference becomes close to $\pi/2$ between the directions of the directional radiation patterns for the specific first-antenna output signal selected by said first selection circuit and the specific second-antenna output signal selected by said second selection circuit.

22. The diversity receiver of claim 20, wherein said antenna control unit controls on the basis of first reception-power information, first delay-profile information, and first noise information that are obtained based on the specific first-antenna output signal selected by said first selection circuit; second reception-power information, second delay-profile information, and second noise information that are obtained based on the specific second-antenna output signal selected by said second selection circuit; and third noise information and error information that are obtained based on the diversity-combined signal.

* * * * *